United States Patent
Kawai

(10) Patent No.: US 7,443,530 B2
(45) Date of Patent: Oct. 28, 2008

(54) ELECTRONIC APPARATUS, IMAGE FORMING SYSTEM, VIDEO PRINTING SYSTEM AND CAMERA-INCORPORATED RECORDING/REPRODUCING APPARATUS

(75) Inventor: Kenji Kawai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 10/929,536

(22) Filed: Aug. 31, 2004

(65) Prior Publication Data

US 2005/0024678 A1   Feb. 3, 2005

Related U.S. Application Data

(63) Continuation of application No. 10/385,616, filed on Mar. 12, 2003, now abandoned, which is a continuation-in-part of application No. 09/016,643, filed on Jan. 30, 1998, now abandoned.

(30) Foreign Application Priority Data

Jan. 31, 1997   (JP)   ................................. 9-018774

(51) Int. Cl.
*G06F 15/00* (2006.01)
(52) U.S. Cl. .................................................... 358/1.15
(58) Field of Classification Search .............. 358/1.15, 358/2.9, 211, 225, 228, 909, 256, 29, 296, 358/75; 353/313; 395/750; 364/707; 365/108; 271/9, 263; 378/166; 348/143; 354/430, 354/412; 355/313
See application file for complete search history.

(56) References Cited

U.S. PATENT DOCUMENTS

| | | | | |
|---|---|---|---|---|
| 4,716,470 A | * | 12/1987 | Levine | 358/400 |
| 4,937,676 A | * | 6/1990 | Finelli et al. | 348/375 |
| 4,970,584 A | * | 11/1990 | Sato et al. | 358/518 |
| 5,016,039 A | * | 5/1991 | Sosa et al. | 396/50 |
| 5,105,229 A | * | 4/1992 | Ozaki | 399/17 |
| 5,155,581 A | * | 10/1992 | Tanaka et al. | 348/225.1 |
| 5,296,889 A | * | 3/1994 | Imai | 396/48 |
| 5,408,501 A | | 4/1995 | Cornaby | 375/260 |
| 5,416,823 A | * | 5/1995 | Livingston | 378/166 |
| 5,454,112 A | * | 9/1995 | Kadono et al. | 713/340 |
| 5,517,236 A | * | 5/1996 | Sergeant et al. | 348/143 |
| 5,699,494 A | | 12/1997 | Colbert et al. | 395/114 |
| 5,706,411 A | | 1/1998 | McCormick et al. | 395/114 |
| 5,793,366 A | | 8/1998 | Mano et al. | 345/329 |
| 5,802,017 A | | 9/1998 | Sato et al. | 369/2 |
| 5,802,057 A | | 9/1998 | Duckwall et al. | 370/408 |
| 5,847,836 A | * | 12/1998 | Suzuki | 358/296 |

(Continued)

*Primary Examiner*—King Y Poon
*Assistant Examiner*—Allen H Nguyen
(74) *Attorney, Agent, or Firm*—Fitzpatrick, Cella, Harper & Scinto

(57) ABSTRACT

The object of the present invention is, while employing only a simple structure, to engage in rapid communication with an external device and to display results of the communication. According to the present invention, disclosed is an electronic apparatus, which comprises conversion means for converting a target image into image signals, supply means for supplying, to a monitor, signals in consonance with the image signal obtained by the conversion means in order to reproduce the target image, communication means for using a DS-Link method to perform bidirectional communication with an external device handling the image signal for the target image and control means for displaying on the monitor information concerning the external device that is obtained by the communication means.

14 Claims, 26 Drawing Sheets

U.S. PATENT DOCUMENTS 5,867,494 A    2/1999   Krishnaswamy et al. .... 370/352
6,009,528 A    12/1999   Teraoka ...................... 713/201
2002/0063880 A1    5/2002   Raney ....................... 358/1.14

* cited by examiner

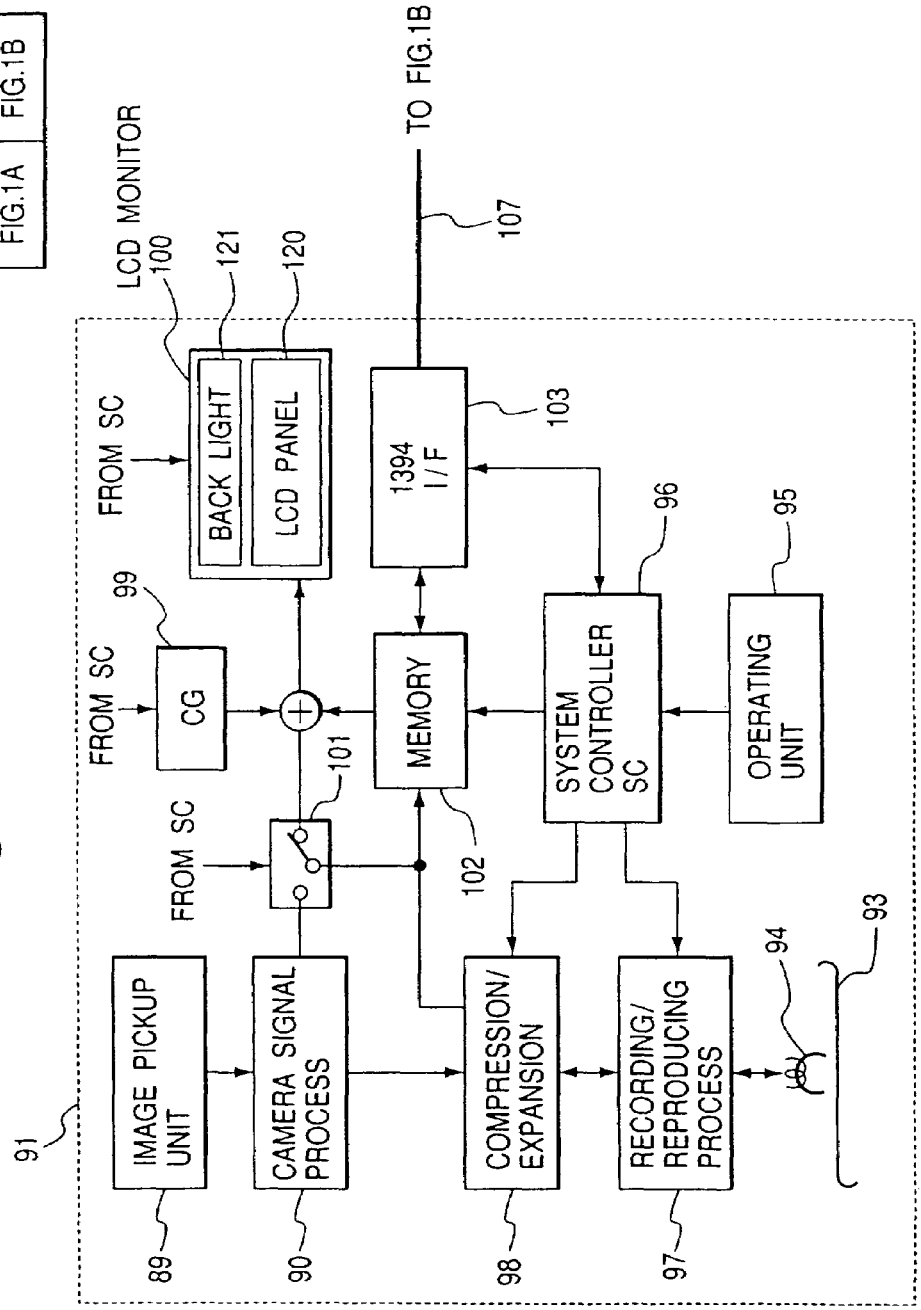

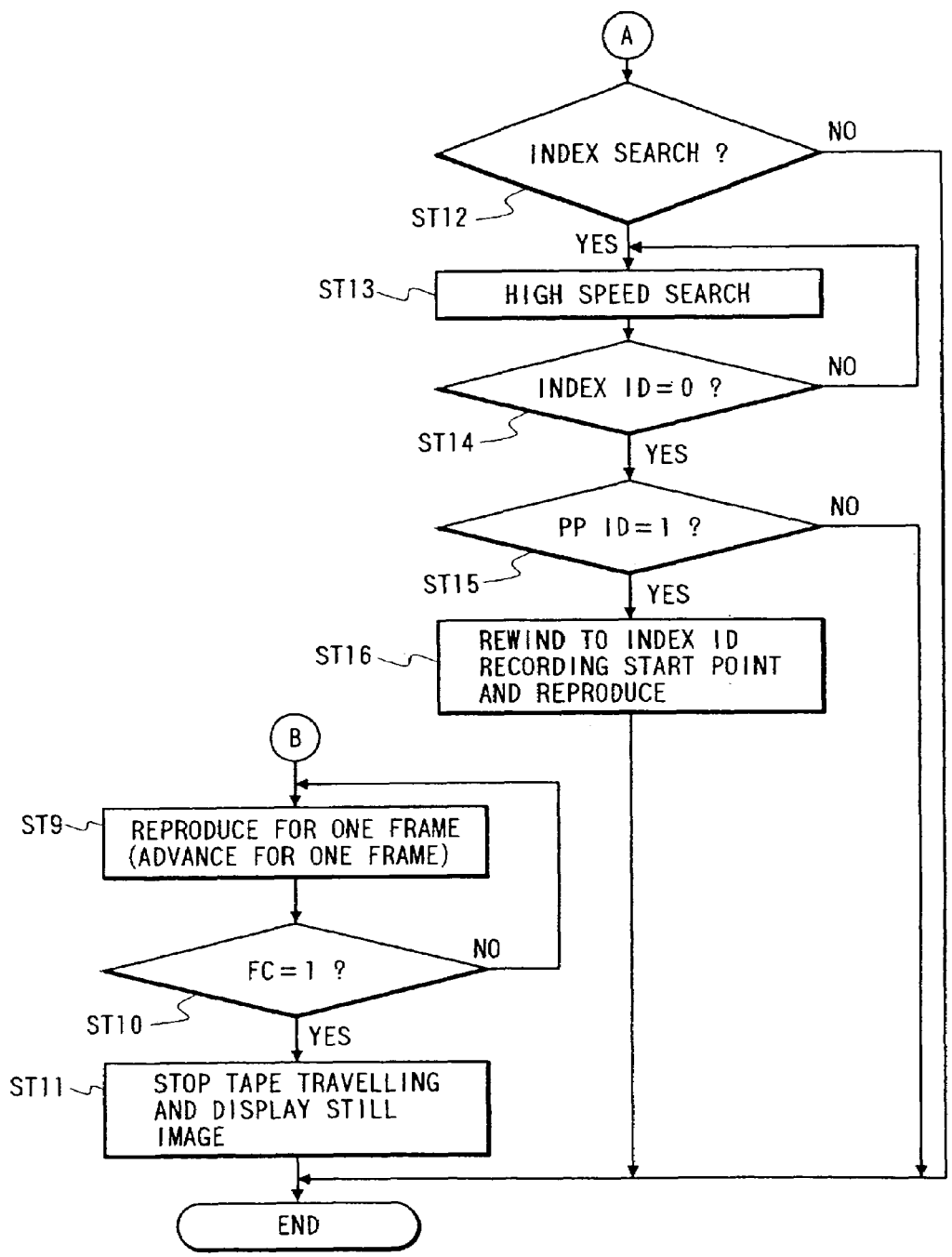

POWER SOURCE LINE
(8 – 40V DC MAXIMUM CURRENT 1.5A)

TWO PAIRS OF TWIST PAIR SIGNAL LINE (CROSS SECTIONAL VIEW OF CABLE)

SIGNAL LINE SHIELD

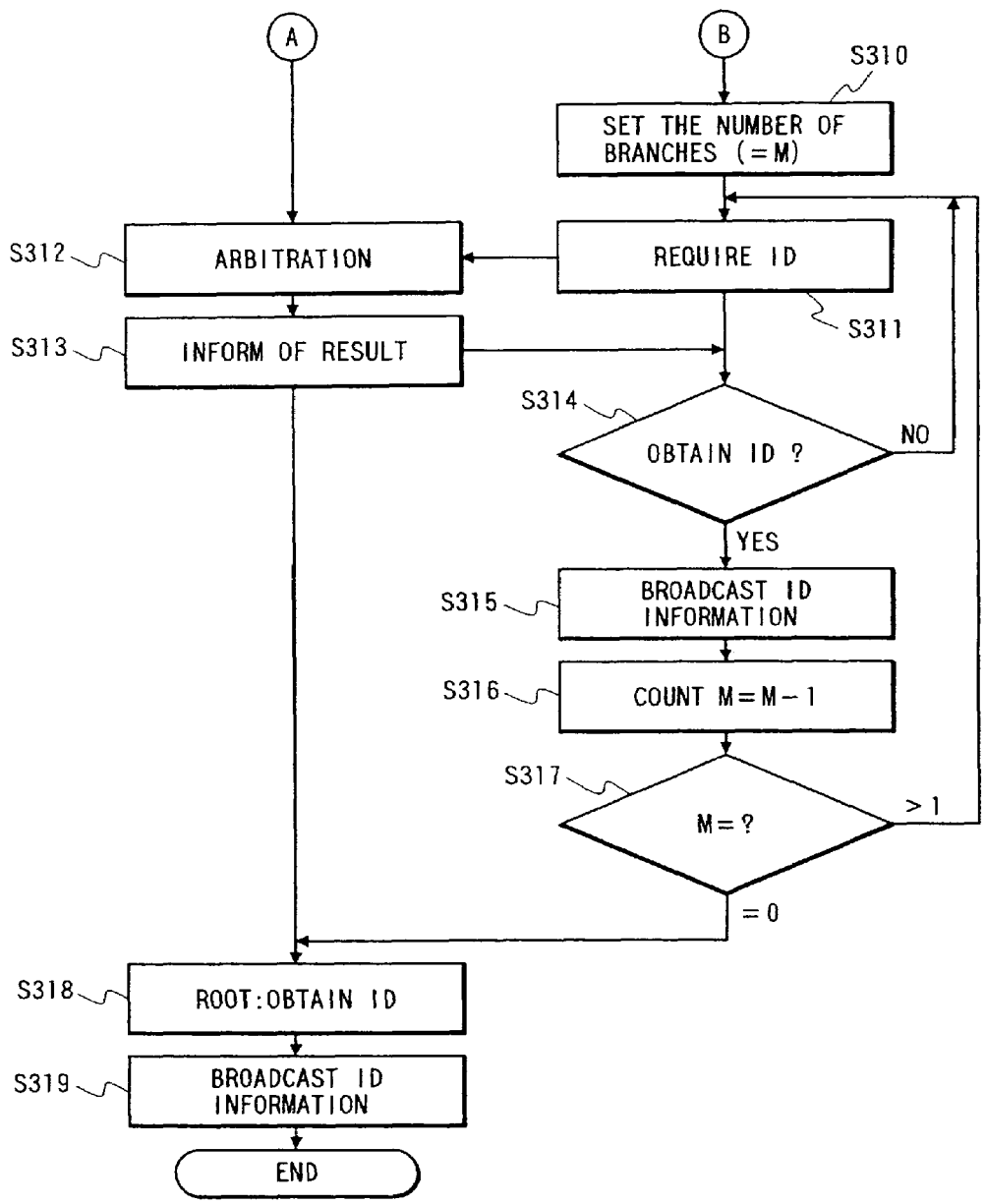

US 7,443,530 B2

ELECTRONIC APPARATUS, IMAGE FORMING SYSTEM, VIDEO PRINTING SYSTEM AND CAMERA-INCORPORATED RECORDING/REPRODUCING APPARATUS

The present application is a continuation of application Ser. No. 10/385,616, filed on Mar. 12, 2003, which is a continuation of application Ser. No. 09/016,643, filed on Jan. 30, 1998, 2000, the entire contents of which is incorporated herein by reference.

BACKGROUND OF THE INVENTION

1. Field of the Invention

The present invention relates to an image pickup apparatus, an image forming system, and a video printing system.

2. Related Background Art

In a conventional video printing system, for example, a video printer is connected as an external device to an analog recording camera-incorporated VTR, and a desired static picture is searched for and is output by the video printer.

However, since such a video printing system employs analog signals for communication, bidirectional communication with an external device is difficult. Therefore, because of image quality and printing speed, an image forming system and a printing system that transmit digital moving pictures in real time have been demanded.

SUMMARY OF THE INVENTION

To resolve the above problem, it is one object of the present invention to provide an electronic apparatus that can perform data communication at high speed.

It is another object of the present invention to improve the usability of an image forming system, a video printing system and a camera-incorporated recording/reproduction apparatus for these systems.

It is an additional object of the present invention to provide an electronic apparatus, a video printing system and an image forming system with which data communication with an external device can be performed at high speed.

To achieve the above objects, according to the preferred embodiment, it is disclosed to provide an apparatus comprising supply means for supplying an image signal for a target image to a monitor in order to reproduce the target image; communication means for using a DS-Link method to perform bidirectional communication with an external device, which handles the image signal for the target image; and control means for displaying on the monitor information concerning the external device that is obtained by the communication means.

In addition, it is a further object of the present invention to provide a video printing system having a novel function, and an apparatus constituting such a system.

Other objects and the features of the present invention will become apparent during the course of the description of the embodiment, which will be given while referring to the accompanying drawings.

DETAILED DESCRIPTION OF THE PREFERRED EMBODIMENTS

Before the introduction of a typical example where a digital interface (D-I/F) is employed to connect a camera-incorporated VTR to a printer, the IEEE 1394 standard will be described as one example D-I/F employed for the preferred embodiments.

<<Outline of the IEEE 1394 Standard>>

In consonance with the appearance of public digital VCRs and DVD players, support for the real-time transfer of large quantities of data, such as video data and audio data, come to be required. In order to transfer video data and audio data in real time and to fetch them for use by a personal computer (PC) or to transfer them to another digital apparatus, an interface was required having a function that enables the fast transfer of data. To satisfy this need, the IEEE1394-1995 standard for a bus (a High Performance Serial Bus, hereinafter referred to as a 1394 serial bus) was developed.

Figure 8:
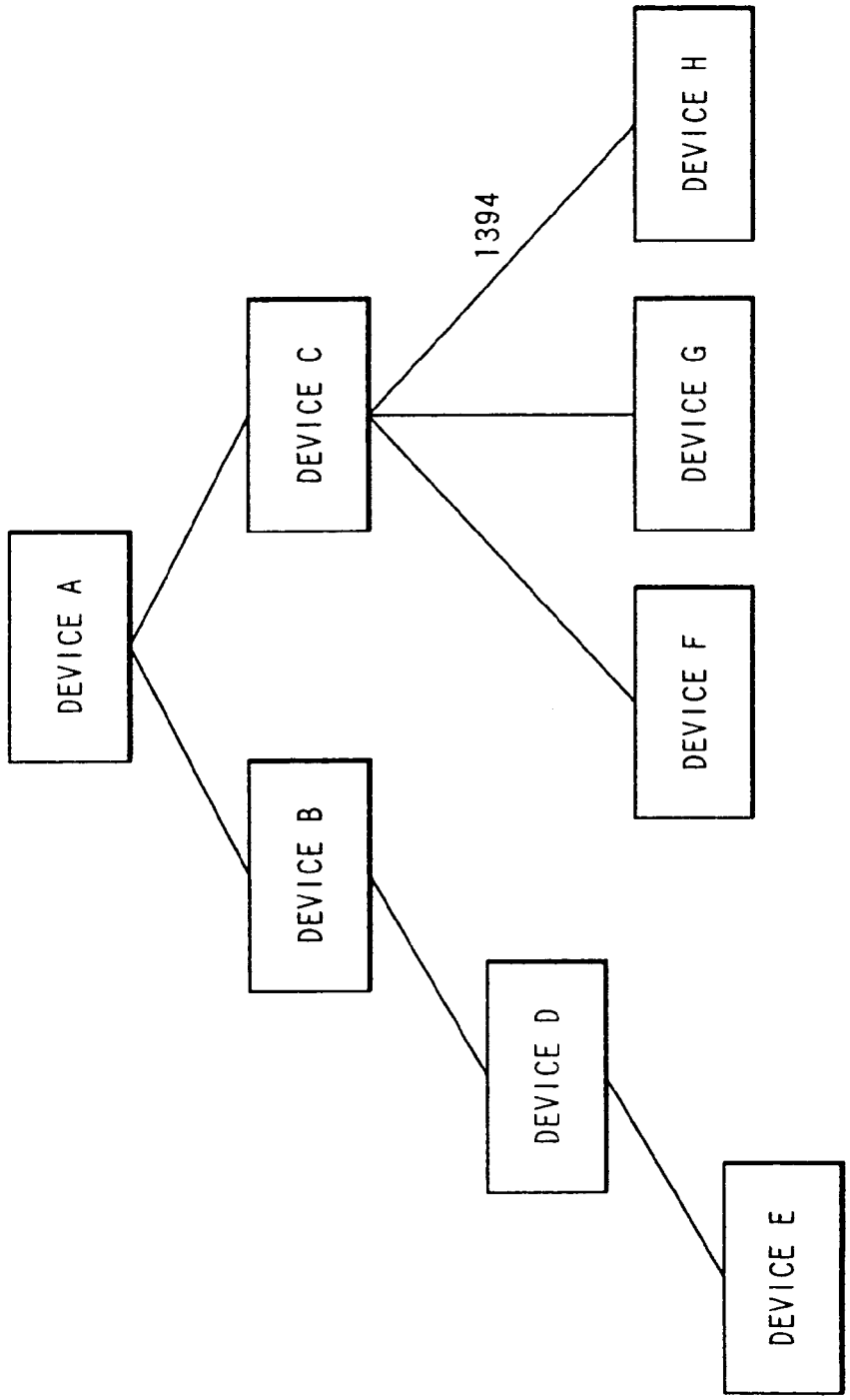
FIG. 8 is a diagram showing an example communication system employing an IEEE 1394 cable.

In FIG. 8 is shown an example network system employing the 1394 serial bus. The system comprises devices A, B, C, D, E, F, G and H, and the devices A-B, B-D, D-E, C-F, C-G, and C-H are connected by twisted pair cables of the 1394 serial bus. The devices A to H are, for example, a personal computer, a digital VTR, a DVD, a digital camera, a hard disk, a monitor, a tuner and a monitor.

The configuration used for the connection of the individual devices can be a combination of the daisy chain and the node branching methods. This configuration provides a high degree of freedom of connection.

Each of the devices has its inherent ID, and as the devices can recognize the others' IDs, they can constitute a single network within the range established for the 1394 serial bus by which they are connected. Only when the digital devices are connected by a single 1394 serial bus cable, the individual devices serve as relays, thereby constituting a single network. Each of the devices has a function for automatically identifying other devices and the state of their connection when the devices are connected by the cable to the 1394 serial bus and the Plug&Play function.

Further, when a device is removed from the network or a new device is added, the system shown in FIG. 8 automatically resets the bus and resets the network configuration, and thereafter builds a new network. With this function, the current configuration of the network can be always set and identified.

The data transfer speeds provided are 100/200/400 Mbps, and for compatibility, devices having higher transfer speeds support lower transfer speeds.

The data transfer modes are: an Asynchronous transfer mode in which asynchronous data (hereinafter referred to as Async data), such as control signals, are transferred; and an Isochronous transfer mode in which isochronous data (hereinafter referred to as Iso data), such as video data and audio data, are transferred in real time. After the transfer of a cycle start packet (CSP) indicating a cycle start, a mixture of Async data and Iso data is so transferred during a cycle that the Iso data is transferred before the Async data.

Figure 9:
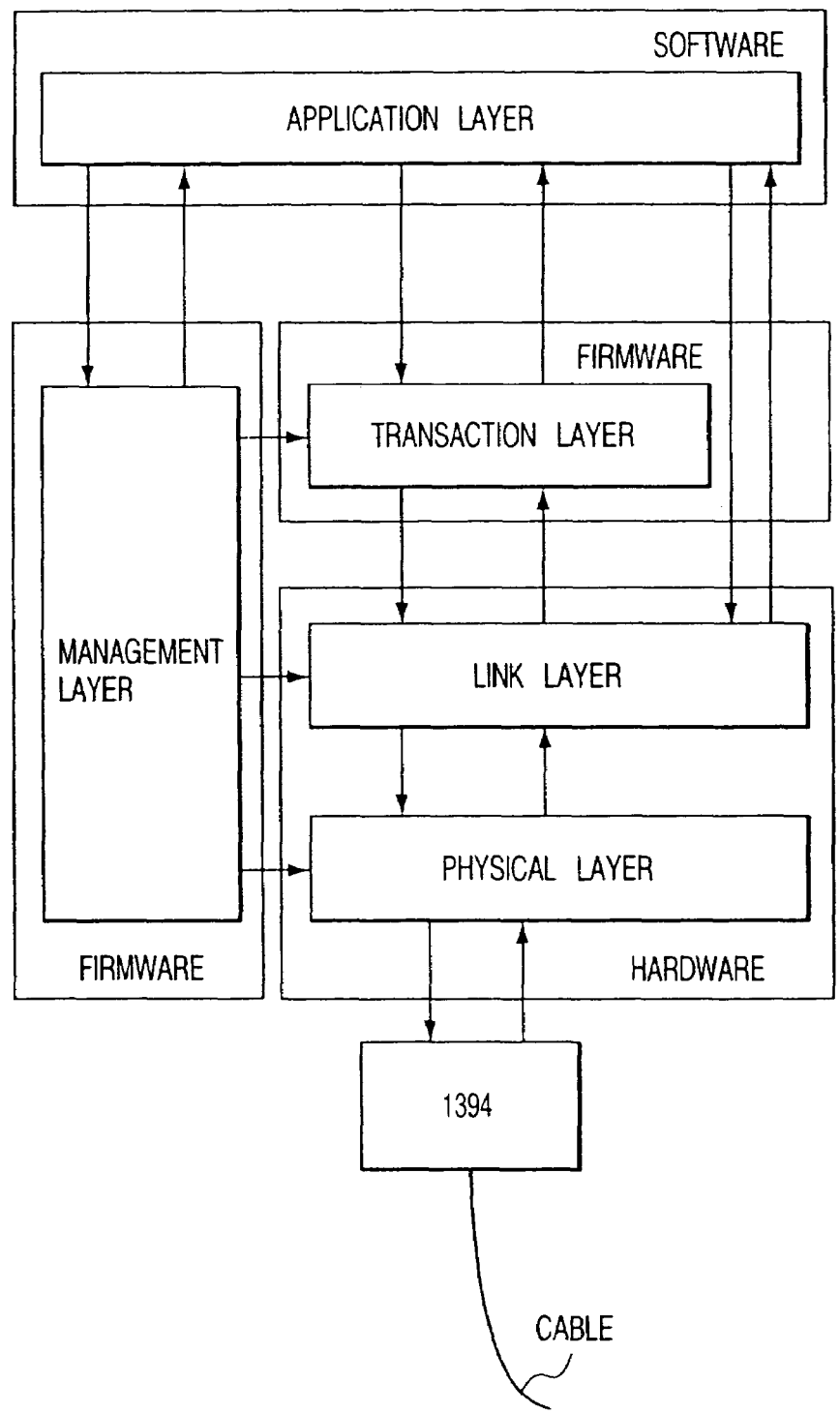
FIG. 9 is a diagram showing the hierarchial structure for the IEEE 1394 standard.

In FIG. 9 are shown the components of the 1394 serial bus.

The 1394 serial bus is constituted by the layers as a whole. As is shown in FIG. 9, a connector board is provided to which the cable and the connector for the 1394 serial bus are connected, and a hardware section comprising a physical layer and a link layer are positioned it.

The hardware section is substantially an interface chip. The physical layer performs the coding and the control for connectors, and the link layer performs packet transfers and controls the cycle time.

The firmware transaction layer in the firmware section manages the data that are to be transferred (transactions) and issues Read, Write and Lock commands. The management layer manages the connection conditions for the connected devices, and their IDs, and also manages the configuration of the network.

The hardware and software sections substantially-constitute the 1394 serial bus.

The configuration of the application layer in the software section differs depending on the software that is employed, and regulates the loading of data via the interface. A printer and the AVC protocol are specified.

This completes the explanation of the structure of the 1394 serial bus.

Figure 10:
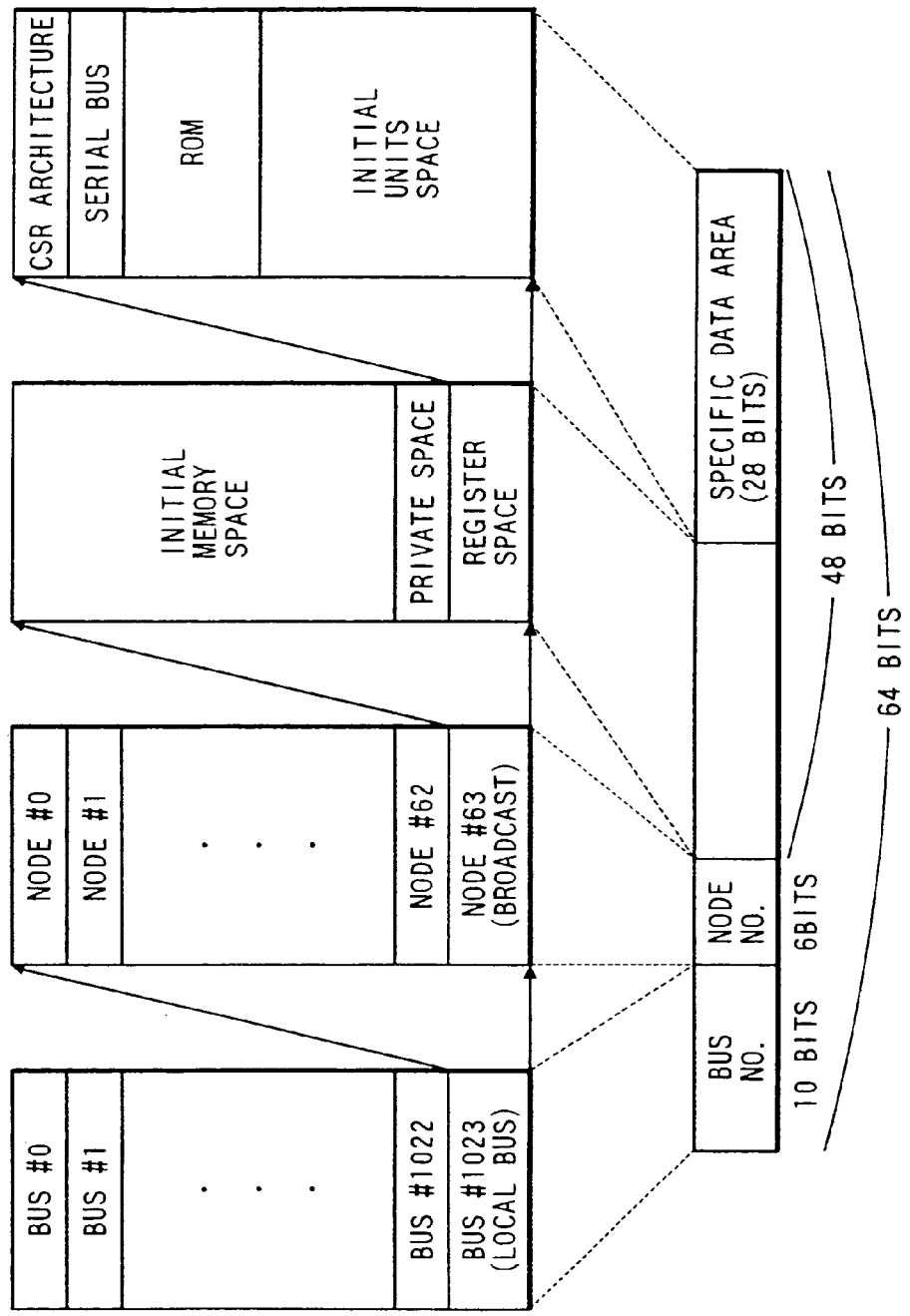
FIG. 10 is a diagram showing address space for the IEEE 1394 standard.

The address space in the 1394 serial bus is shown in FIG. 10.

Inherent 64 bit addresses for individual devices (nodes) are provided for the devices connected to the 1394 serial bus. The addresses are stored in the ROM, so that a device's node address and the addresses of the other devices can always be identified, and so that communication with designated devices can be performed.

The addressing method for the 1394 serial bus conforms to the IEEE 1212 standard, with the first ten bits being employed for the designation of a bus number and the following six bits being employed for the designation of a node ID number. The remaining 48 bits are used as an address width for a device, and can be used as an inherent address space. The last 28 bits are used as an inherent data region in which are stored data for the identification of the devices and for the designation of the devices' employment condition.

This completes an outline of the way in which the 1394 serial bus is employed.

The characteristics of the 1394 serial bus will now be explained in detail.

<<Electric Specifications for the 1394 Serial Bus>>

Figure 11:
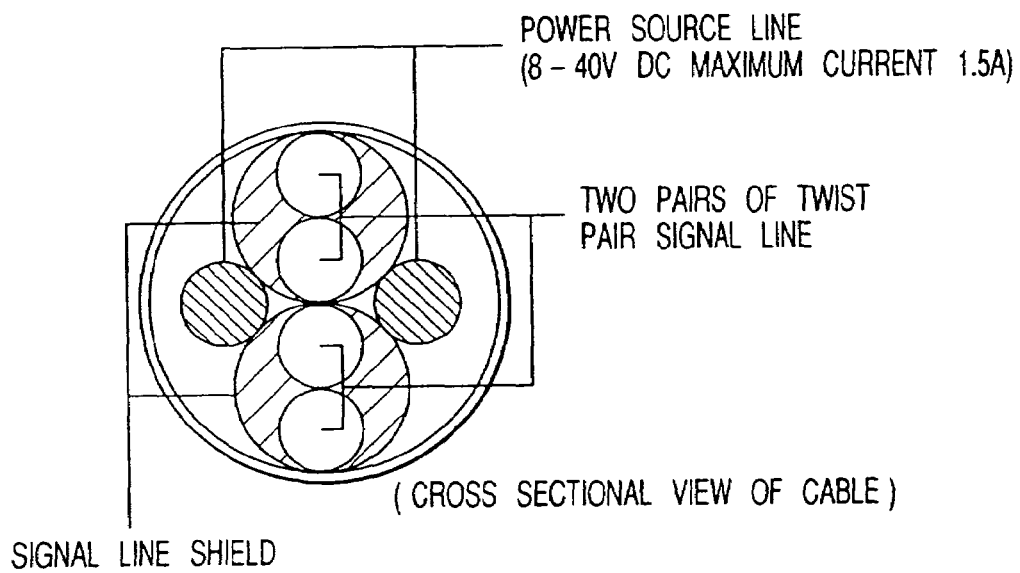
FIG. 11 is a cross-sectional view of the IEEE 1394 cable.

FIG. 11 is a cross-sectional view of a 1394 serial bus cable.

For the 1394 serial bus, six pins, i.e., two twist paired signal lines and power source lines, are provided for a connection cable. With this structure, power can be supplied to devices having no power sources, and to devices whereat voltage drops have occurred as a result of malfunctions.

The voltage of the current flowing along the power source line is specified at 8 to 40 V, and a maximum DC current of DC 1.5 A is specified.

It should be noted that according to DV cable standards, the connection for the serial bus cable has four pins, excluding the pins for the power source lines.

<<DS-Link Coding>>

Figure 12:
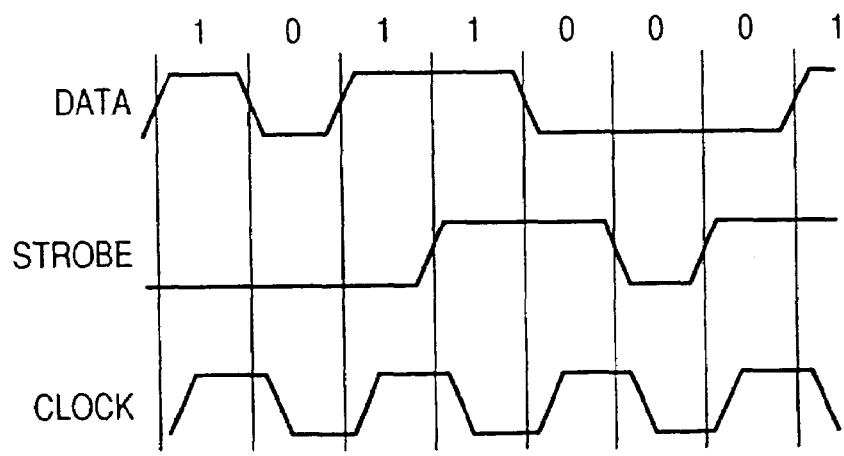
FIG. 12 is a diagram for explaining the DS-Link coding method.

FIG. 12 is a diagram for explaining the DS-Link coding method for a data transfer format that is employed for the 1394 serial bus.

The DS-Link (Data/Strobe Link) coding method is employed for the 1394 serial bus. The DS-Link coding method is appropriate for fast serial data communication, and requires the use of two signal lines. Primary data are transmitted along one of the paired signal lines, and strobe signals are transmitted along the other signal line. The receiving side acquires exclusive OR for the received data and the strobe signal to reproduce a clock, as is shown in FIG. 12.

The reasons that the DS-Link coding method is employed are: its transfer efficiency is higher than is that for an 8/10B conversion; a PLL circuit is not required and the circuit scale for a controller LSI can be reduced; and, since when there is no data to be transferred it is not necessary to send an idling state signal, the transceiver circuits of individual devices can be set to the sleeping state and the consumption of power can be reduced.

<<Bus Reset Sequence>>

The 1394 serial bus is so controlled that a node ID can be provided for each connected device (node) in order to identify the network configuration.

When the network configuration is changed, for example, by an increase or decrease in the number of nodes, which is caused by the insertion or removal of a node or by the turning on or off of the power source, and a new network configuration must be identified, the nodes that detect the change transmit a bus reset signal to the bus and enter the mode for the identification of a new network configuration. The detection of the change is performed by detecting a change in a bias voltage at a 1394 port substrate.

When a specific node has transmitted a bus reset signal, the physical layers of the individual nodes receive the bus reset signal, and at the same time, notify the link layers of the occurrence of the bus reset and transmit the bus reset signal to the other nodes. The bus reset signal is sent from node to node, and is finally transmitted from the branch to the node at the root. When all the nodes have detected the bus reset signal, resetting of the bus is initiated.

The resetting of the bus is initiated either by the insertion or the removal of the cable or by the detection of a network hardware abnormality, or by a command being issued directly to the physical layer under the control of the host as provided for by the protocol.

Further, when the bus reset is initiated, the data transfer process is temporarily halted and is set to the wait state. Subsequently, the transfer of data is resumed when the acquisition of a new network configuration is completed.

This completes the explanation for the bus reset sequence.

<<Node ID Designation Sequence>>

After the bus reset is completed, the processing is performed for providing an ID for each node in order to construct a new network configuration. The general sequence of the processing performed from the time the bus is reset until the decisions concerning the node IDs are made will now be described while referring to flowcharts in FIGS. 20, 21, 22A and 22B.

Figure 20:
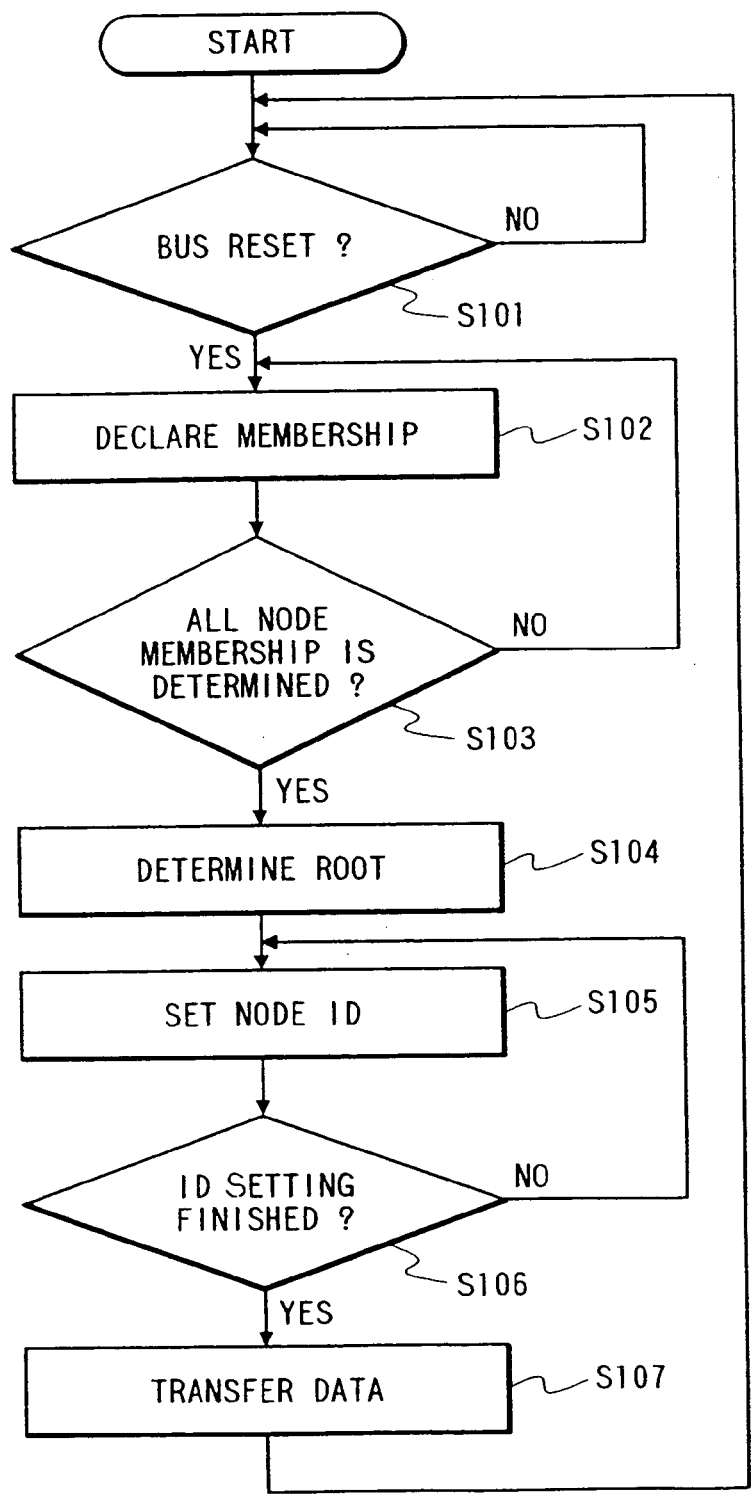
FIG. 20 is a flowchart for explaining a process performed from the resetting of a bus to the setting of an ID.

In the flowchart in FIG. 20 is shown the sequential bus processing performed from the time the bus reset was initiated until the node ID decisions are completed and the transfer of data can be resumed.

First, at step S101 the network is constantly monitored in order to detect the occurrence of a reset. When a bus reset occurs due to the powering on or off of the node, program control advances to step S102.

At step S102 parental relationships are declared for nodes that are directly connected in order to obtain the connection condition for a new network. When, at step S103, it is found that the parental relationships of all the nodes have been determined, at step S104 a root is determined. Until the parental relationships of all the nodes are determined, the declaration of the parental relationships at step S102 is repeated and no root is determined.

If, at step S104, the root is determined, at step S105 a node ID is set to provide an ID for each node. A predetermined node order is employed for setting the node IDs, and the setting process is repeated until IDs are provided for all the nodes. Finally, when at step S106 it is found that IDs have been established for all the nodes, it is assumed that together the nodes identify a new network configuration. At this time the transfer of data between the nodes can be resumed and at step S107 it is initiated.

In the condition at step S107, the operation enters again the mode for the monitoring to detect the occurrence of a bus reset. When a bus reset occurs; the setting process at steps S101 to S106 is repeated.

Figure 21:
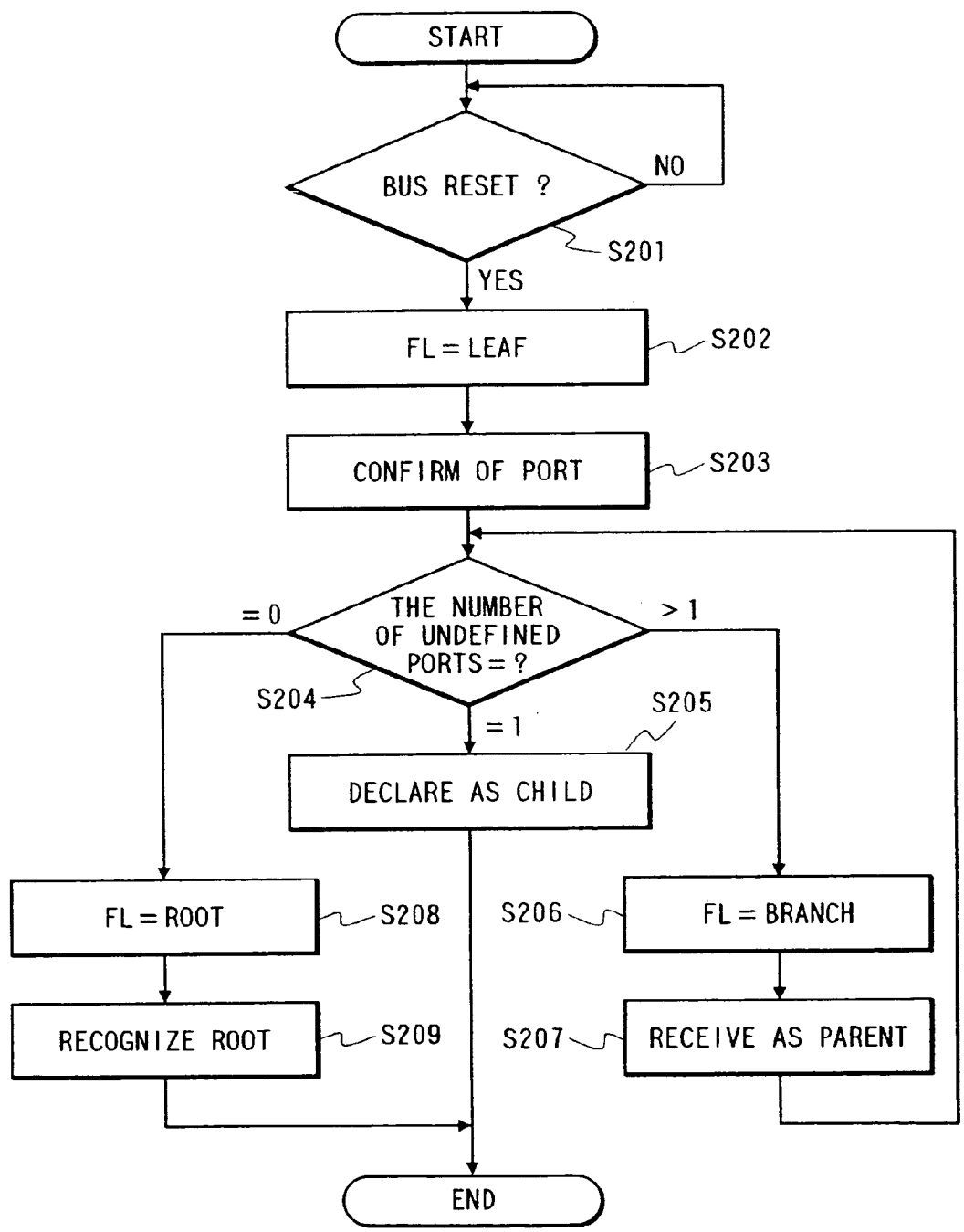
FIG. 21 is a flowchart for explaining a route decision method.
Figures 22, 22A:
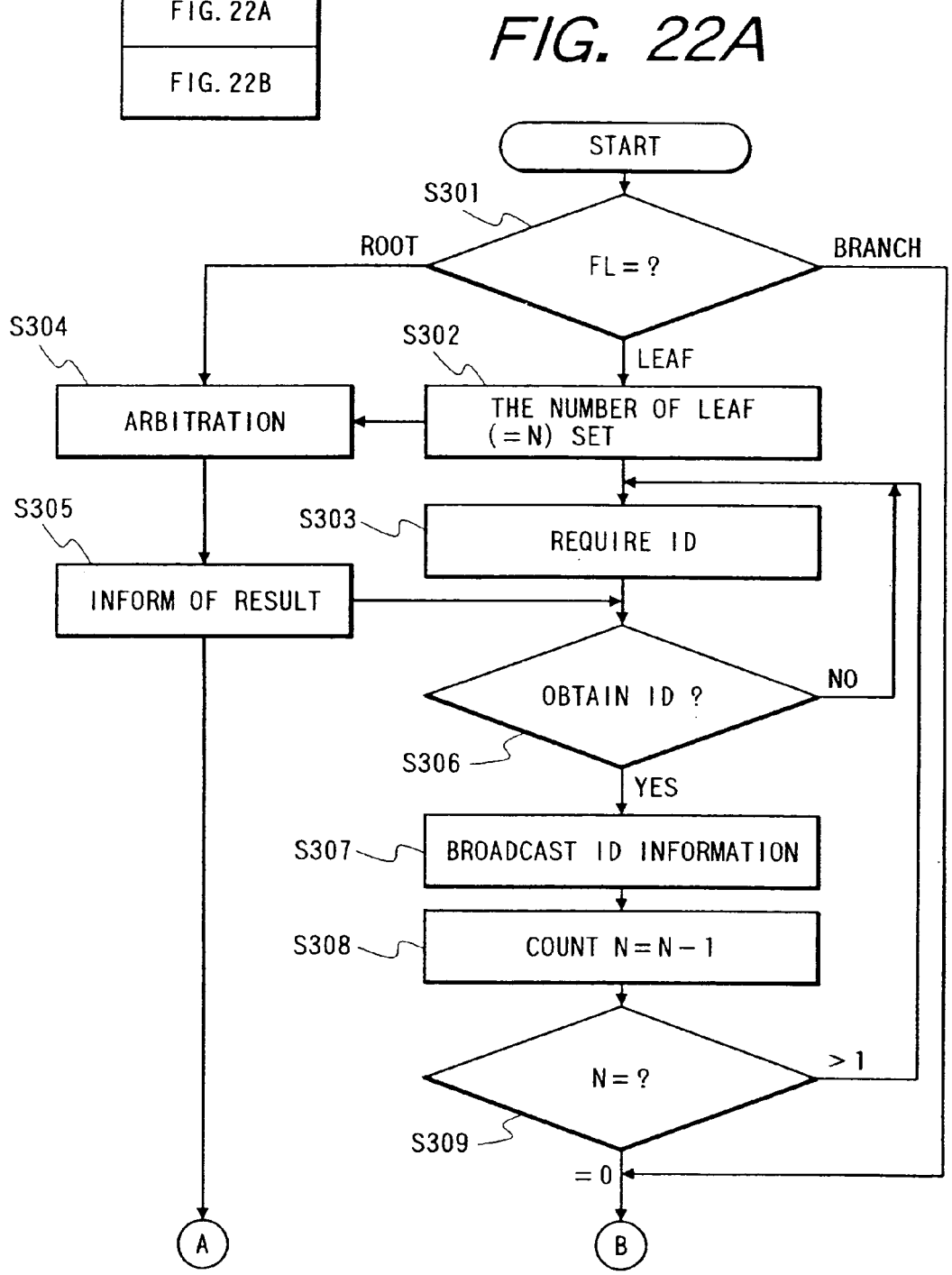
FIG. 22 is comprised of FIGS. 22A and 22B showing flowcharts for explaining a process performed from the decision for the parental relationship to the setting of all the node IDs.

This completes the explanation for the processing performed according to the flowchart in FIG. 20. In FIGS. 21, 22A and 22B are detailed flowcharts for the processing in FIG. 20 performed from the time the bus is reset until the root is determined, and performed from the time the root is determined until the ID setting is completed.

First, the processing performed in the flowchart in FIG. 21 will be explained.

When a bus reset occurs at step S201, the network configuration is temporarily reset. It should be noted that at step S201 constant monitoring is performed to detect the occurrence of a bus reset.

At step S202 a flag representing a leaf (node) is set for individual devices as the first stage of the process for again identifying the connection condition of the reset network. At step S203 the individual devices perform a confirmation process for their ports to determine how many other nodes are connected to them.

In accordance with the number of ports obtained as a result at step S204, the count of the undefined ports (for which no parental relationships have been determined) is examined in order to initiate the declaration of the parental relationships. While the number of ports is equal to the number of undefined ports immediately after the bus is reset, the number of undefined ports detected at step S204 changes as the parental relationships are determined.

First, immediately after the bus reset, only a leaf can declare a parental relationship. Whether a node is a leaf or not can be determined by performing the confirmation process for ascertaining the number of ports at step S203. When at step S205 a leaf declares that "I am a child and the other is a parent", relative to a node connected to the leaf, the processing is thereafter terminated.

For a node that is identified at step S203 as being a branch having a plurality of ports, at step S204 the number of undefined ports>1 is determined immediately after the bus is reset. Program control therefore moves to step S206, whereat a flag representing the branch is set, and to step S207, whereat the branch waits for the receipt of a "parent" designation after the leaf declares the parental relationship.

Once the leaf declares the parental relationship, upon the receipt of the declaration at step S207 the branch confirms the count of the undefined ports at the declaration step S204. When the number of undefined ports is 1, the declaration "I am a child" at step S205 is possible for a node that is connected to the remaining port. The second and subsequent times, at step S207 a branch that has two or more undefined ports that are confirmed at step S204 waits for the receipt of a "parent" designation from a leaf or another branch.

Finally, when one of the branches, or exceptionally, a leaf (because it did not perform quickly enough, even though it could declare a child), has no undefined ports at step S204, it is assumed that the declaration of the parental relationship for the entire network has been completed. At step S208 a root flag is set to represent only one node that has no undefined port (all the other ports are determined to be parent ports), and at step S209 the node is identified as the root.

The processing performed from the time the bus is reset in FIG. 21 until the declaration of the parental relationship has been completed for all the nodes in the network is thus terminated.

The processing shown in the flowchart in FIGS. 22A and 22B will now be described.

Since during the sequence in FIG. 21 flag information is set for the nodes that are leaves, branches and root, this information can be employed at step S301 to sort the nodes.

In the job for providing the IDs for the individual nodes, the setting of the ID begins at the leaves. The ID is set first for the leaf, then for the branch, finally for the root, in ascending order (node numbers=0, . . . ).

At step S302 the number N (N is a natural number) of leaves that are present in the network is set. At step S303 individual submit requests to the root for IDs. When a plurality of these requests are submitted, at step S304 the root functions as an arbitrator. Therefore, at step S305 an ID number is given to the node that won, and a notice of failure is transmitted to the node that lost. At step S306 the leaf that failed to acquire an ID again issues an ID request, and the same process is repeated. At step S307 a leaf that has acquired an ID broadcasts the ID information for the node to all the other nodes. When a node has broadcast its ID information, at step S308 the count of leaves remaining is decremented by one. When, at step S309, the count of leaves remaining is equal to or greater than 1, the process performed at step S303, to request an ID, and at the following steps is repeated. When all the leaves have broadcast their ID information, at step S309 N=0, and program control thereafter moves to the ID setting for branches.

The ID setting for branches is performed in the same manner as is the ID setting for leaves.

First, at step S310 the number M (M is a natural number) of branches that are present in the network is set. At step S311 the individual branches submit requests the root for IDs. At step S312 the root functions as an arbitrator, and provides numbers in ascending order, beginning at the number following the last number given to the leaves, to the branches, beginning with the branch that won. At step S313 the root transmits ID information or a notice of failure to acquire an ID to the branches that submitted the ID requests. At step S314 the branch that failed to acquire an ID again submits an ID request, and the same process is repeated. At step S315 a branch that has acquired an ID broadcasts the ID information for the nodes to all the other nodes. When a node has broadcast its ID information, at step S316 the count of the branches remaining is decremented by one. When, at step S317, one or more branches remain, the process beginning at step S311, for requesting an ID, is repeated until all the branches have broadcast their ID information. When all the branches have acquired their node IDs, at step S317 M=0. The ID acquisition mode for the branches is thereafter terminated.

When this process is completed, only the root has not acquired the ID information. Then, at step S318 the smallest number of the unused numbers is designated as the ID number of the root, and at step S319 the ID information for the root is broadcast.

As is shown in FIGS. 22A and 22B, the processing performed from the time the parental relationships are determined until the IDs of all the nodes are set is terminated.

An example operation performed in the actual network shown in FIG. 13 will now be described while referring to FIG. 13.

Figure 13:
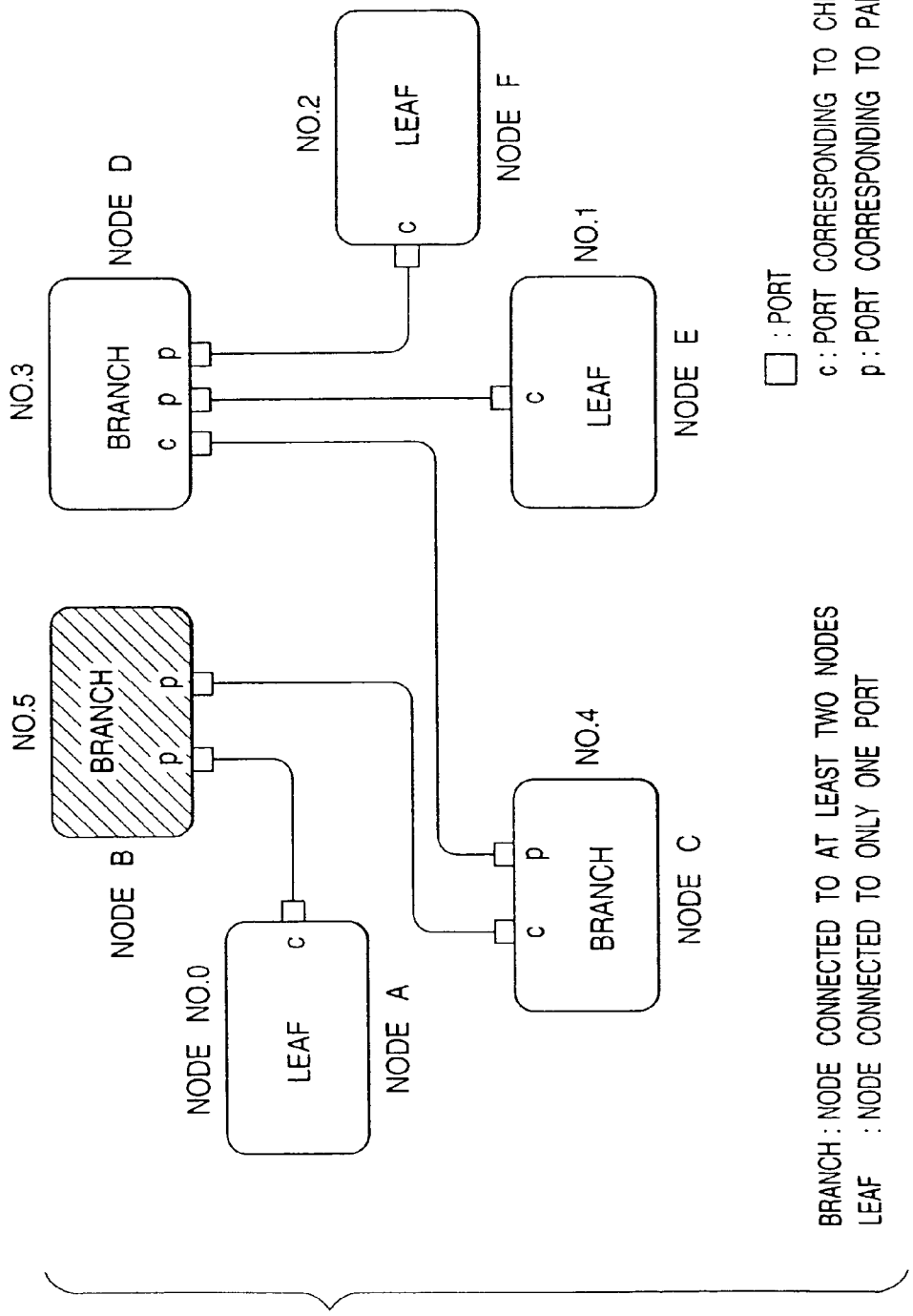
FIG. 13 is a diagram showing the parental relationship of nodes.

In FIG. 13, node A and node C are connected directly to a lower level of node B (root), node D is connected directly to a lower level of node C, and node E and node F are connected directly to a lower level of node D, to thereby constitute a hierarchial structure. The hierarchial structure, and the processing for determining the root, the node and node IDs will now be described.

When the bus has been reset, first, parental relationships are declared for the ports at which nodes are directly connected together, in order to confirm the connection condition of the nodes. According to the parental relationship, a parent is located at a higher level in the hierarchial structure, and a child is located at a lower level.

In FIG. 13, node A is the first to declare its parental relationship after the bus has been reset. Generally, a node (called a leaf) that has a connection at only one port can declare the parental relationship. Since such a node is the first to understand that it has a connection at only one port, the node realizes it is at the end of the network, and the parental relationship is determined for a node that reacts quickly enough. The port of a node (node A for nodes A-B) that has declared the parental relationship is determined to be a child, and the port of the other node (node B) is determined to be a parent. As a result, the parental relationship between nodes A-B is determined to be a child-parent relationship; the relationship between nodes E-D is determined to be a child-parent relationship; and the relationship between nodes F-D is determined to be a child-parent relationship.

At a layer one level higher, nodes (called branches) having a plurality of connection ports declare their parental relationships in the ascending order, beginning at a node that receives a declaration of parental relationship from another node. In FIG. 13, after the parental relationships between nodes D-E and between nodes D-F have been established, first node D declares its parental relationship to node C, and as a result, nodes D-C are determined to have a child-parent relationship.

Upon receipt of the declaration of the parental relationship from node D, node C declares its parental relationship to node B, which is connected to its other port. As a result, the nodes C-B have a child-parent relationship.

In this manner, the hierarchial structure shown in FIG. 13 is established, and node B, which serves as a parent for all the connected nodes, is determined to be the root node. Only one root is present in the network configuration.

In FIG. 13 node B is determined to be the root node; however, if node B, which has received from node A a declaration of the parental relationship, declares the parental relationship to another node at an early time, the other node may serve as the root node. In other words, any of the nodes can be the root node, depending on the timing of the transmission of a declaration, and the root node is not always constant, even in the same network configuration.

When the root node is determined, the operation enters the mode for determining the individual node IDs. In this mode, all the nodes notify the other nodes of their personal node IDs (broadcast function).

The ID data for an individual node includes a node number, information concerning connection positions, the number of ports of the node, the number of ports currently being used for connections, and information concerning the parental relationship for each port.

The assignment of the node ID numbers begins with a node (a leaf) that has only one port connected to another node, and node numbers=0, 1, 2, ... are assigned in the ascending order.

A node that obtains a node ID broadcasts the information, including the node number to the other individual nodes. In this manner, it is confirmed that an ID number has been assigned.

When all the leaves have acquired node IDs, the assignment process for branches is initiated, and node ID numbers following those used for the leaves are sequentially assigned to the individual nodes. As was done by the leaves, the branches that obtain node ID numbers broadcast their node ID information, and at the last the root node broadcasts its ID information. In other words, the root always possesses the highest node ID number.

After the assignment of node IDs for the entire hierarchial structure has been completed, the network configuration is rebuilt, and the initialization process for the bus is terminated.

<<Arbitration>>

For the 1394 serial bus, arbitration of the right to use the bus is always performed prior to a data transfer. Since the 1394 serial bus is a logical bus network wherein the individual connected devices relay received signals so that signals are transmitted to all the devices in the network, arbitration is necessary in order to prevent packet conflicts. As the result of the arbitration, only one node can transfer data during a specific time.

Figure 14A:
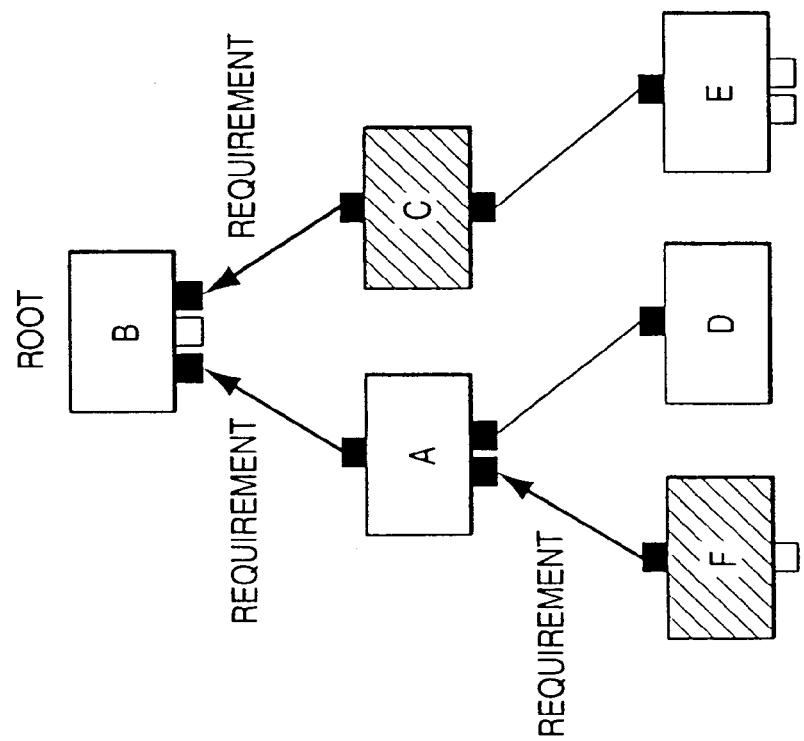
FIGS. 14A and 14B are diagrams for explaining an arbitration process.
Figure 14B:
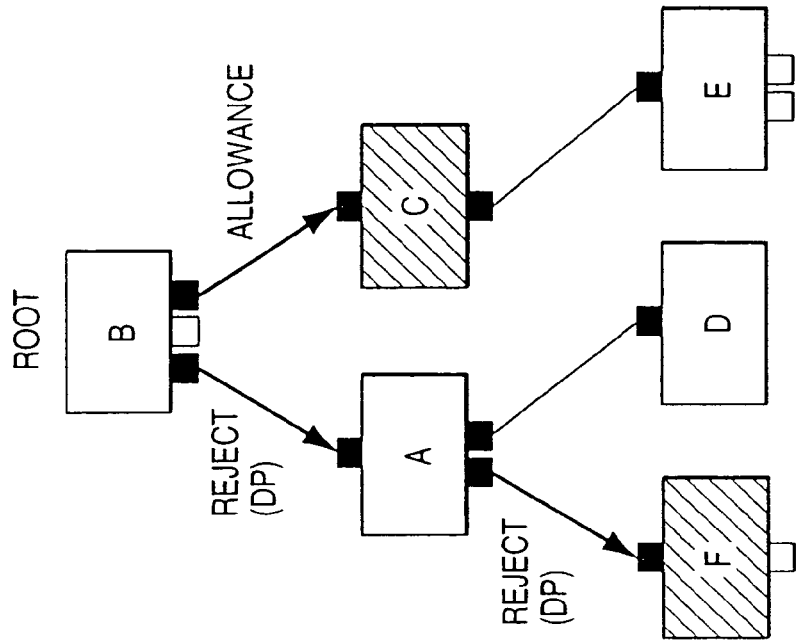

FIGS. 14A and 14B are diagrams of the procedure followed when use of the bus is required, and the arbitration process will now be described while referring to these Figures.

Arbitration is initiated when one or more nodes issue to their parent nodes requests for employment of the bus. In FIG. 14A, node C and node F issue requests for the employment of the bus. Upon receipt of the request from node C, their parent node (node A in FIGS. 14A and 14B) issues (relays) to its parent node a request for employment of the bus. Thus, the request is finally transmitted to the root that performs the arbitration process.

The root node, which has received the requests for the use of the bus, determines which node shall be permitted to use the bus. Only the root node can perform the arbitration process, and award permission (allowance) to use the bus to the wining node. In FIG. 14B, permission to use the bus is awarded to node C and the request from node F is rejected. Thereafter, a DP (Data Prefix) packet is transmitted to the node that lost to notify it that its request was rejected. The node request for the use of the bus that was rejected is held until the next arbitration process is performed.

The node that won in the arbitration process and is permitted to use the bus can begin the transfer of data.

The sequential steps involved in the arbitration process will now be explained while referring to the flowchart in FIG. 23.

The bus must be idle for a node to initiate a data transfer. When a predetermined idle time gap length (e.g., a sub-action gap), which is set for each transfer mode, has elapsed, the node confirms that a preceding data transfer has been terminated and that the bus is currently not being used, and thus determines that it can begin the transfer of data.

At step S401, a check is performed to determine whether or not a predetermined gap length that corresponds to data to be transferred, such as Asyn data or Iso data, can be acquired. Since it is not possible to require use of the bus necessary to start transfer until the predetermined gap length can be obtained, it is necessary to wait until the predetermined gap length can be obtained.

At step S401, when the predetermined gap length can be obtained, it is discriminated whether there is data to be transferred at step S402. When an adequate gap length can be obtained and there is data to be transferred, at step S403 a request for use of the bus is issued to the root in order to obtain use of the bus to transfer data. As is shown in FIG. 13, a signal indicating that use of the bus is requested is relayed by the network devices until it is finally transmitted to the root. When, however, at step S402 there is no data to be transferred, the node enters the standby state.

When, at step S404, the root receives one or more requests issued at step S403 for the use of the bus, at step S405 the root examines the count of the nodes that have issued usage requests. If the node count=1 at step S405 (one node issued a request for bus use), permission for the use of the bus is immediately awarded to the node. If the node count >1 at step S405 (a plurality of nodes issued requests), at step S406 the root performs an arbitration process to determine which node should be permitted to use the bus. This arbitration process is fair, and permission to use the bus is not always awarded to the same node, but the right is distributed equally (fair arbitration).

At step S407, of the nodes that issued the use requests that were the subjects of the arbitration process performed by the root at step S406, the node that was awarded permission to use the bus is separated from the other nodes that lost. At step S408 the root transmits a permission signal to the node that was granted permission to use the bus as the result of the arbitration process, or to the node that was granted permission without the arbitration process being required because the count of the nodes requesting to use the bus was 1 at step S405. Upon the receipt of the permission signal, the subject node immediately begins to transfer data (as packets). At step S409 the root transmits a DP (Data Prefix) packet, which indicates an arbitration process loss, to the nodes that lost as the result of the arbitration process performed at step S406 and are not permitted to use the bus. Upon the receipt of the DP packet, the node return to step S401 in order to again issue requests for the use of the bus for the transfer of data, and wait until predetermined gap lengths are available.

Figure 23:
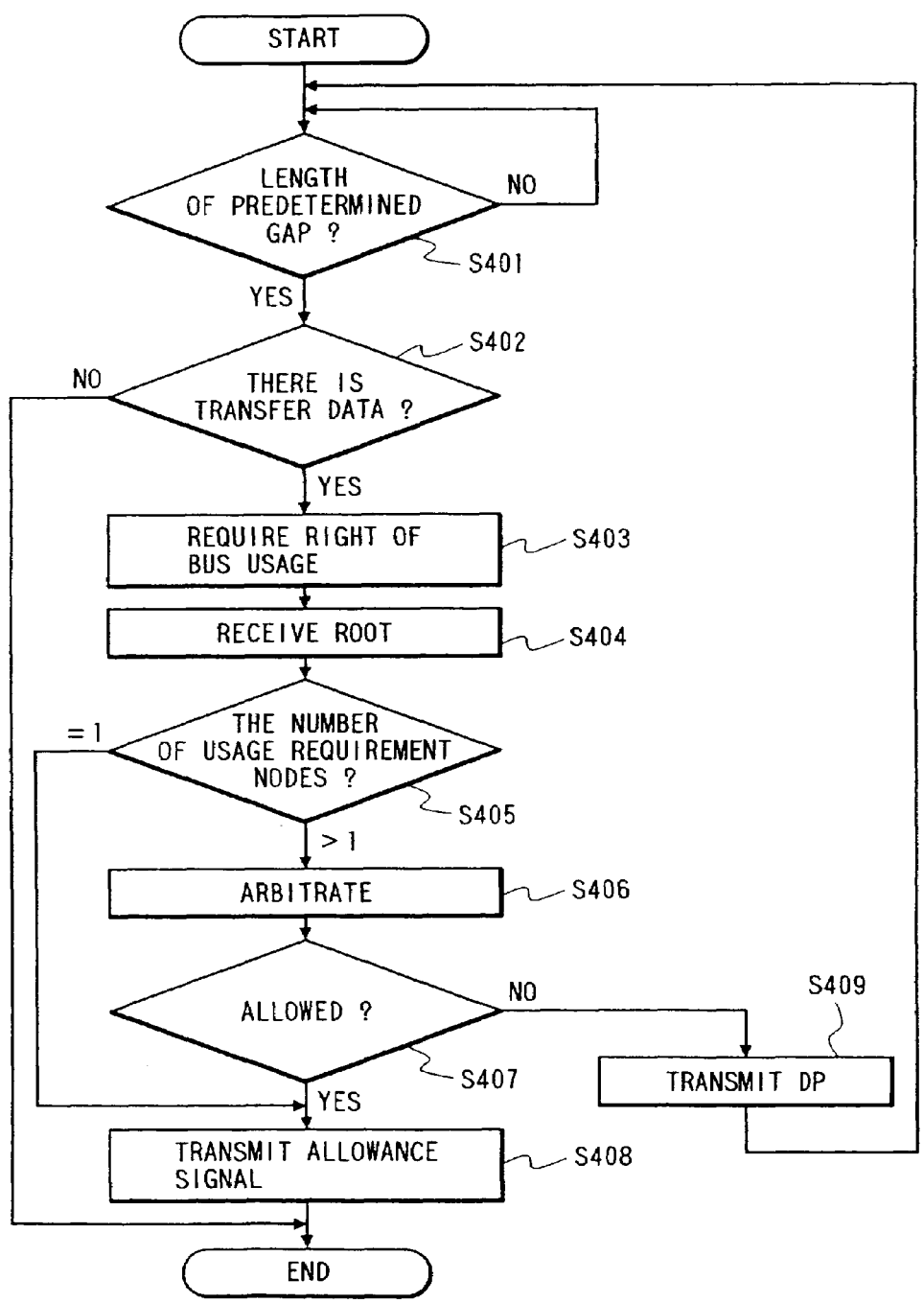
FIG. 23 is a flowchart showing the arbitration process.

The arbitration process has been explained while referring to the flowchart in FIG. 23.

<<Asynchronous Transfer>>

Figure 15:
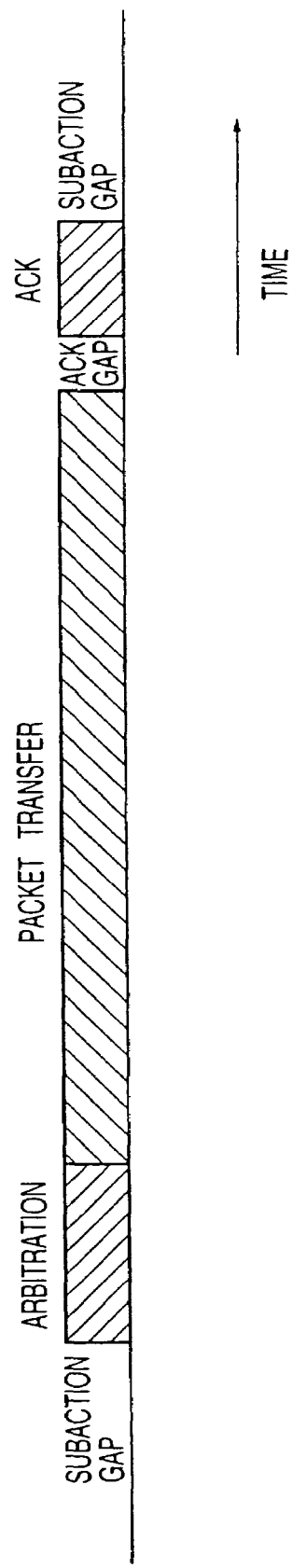
FIG. 15 is a diagram showing a sub-action for the Asynchronous transfer.

In FIG. 15 is shown the time-shift state in asynchronous transfer. The first sub-action gap in FIG. 15 indicates a bus idle state. When the idle time becomes a constant value, the node that desires a data transfer judges that the bus can be used, and engages in the arbitration process to acquire use of the bus.

When as the result of the arbitration process the node is granted permission to use the bus, the node begins the transfer of data as a packet. Upon the receipt of data, a node returns either a reception result ack (acknowledgement return code) or a response packet after a short ack gap has elapsed. Then, the transfer is completed. The code ack, which consists of four data bits and four checksum bits, includes information indicating whether a transfer was successful, or a busy state or a pending state, and is immediately returned to the transmission source node.

Figure 16:
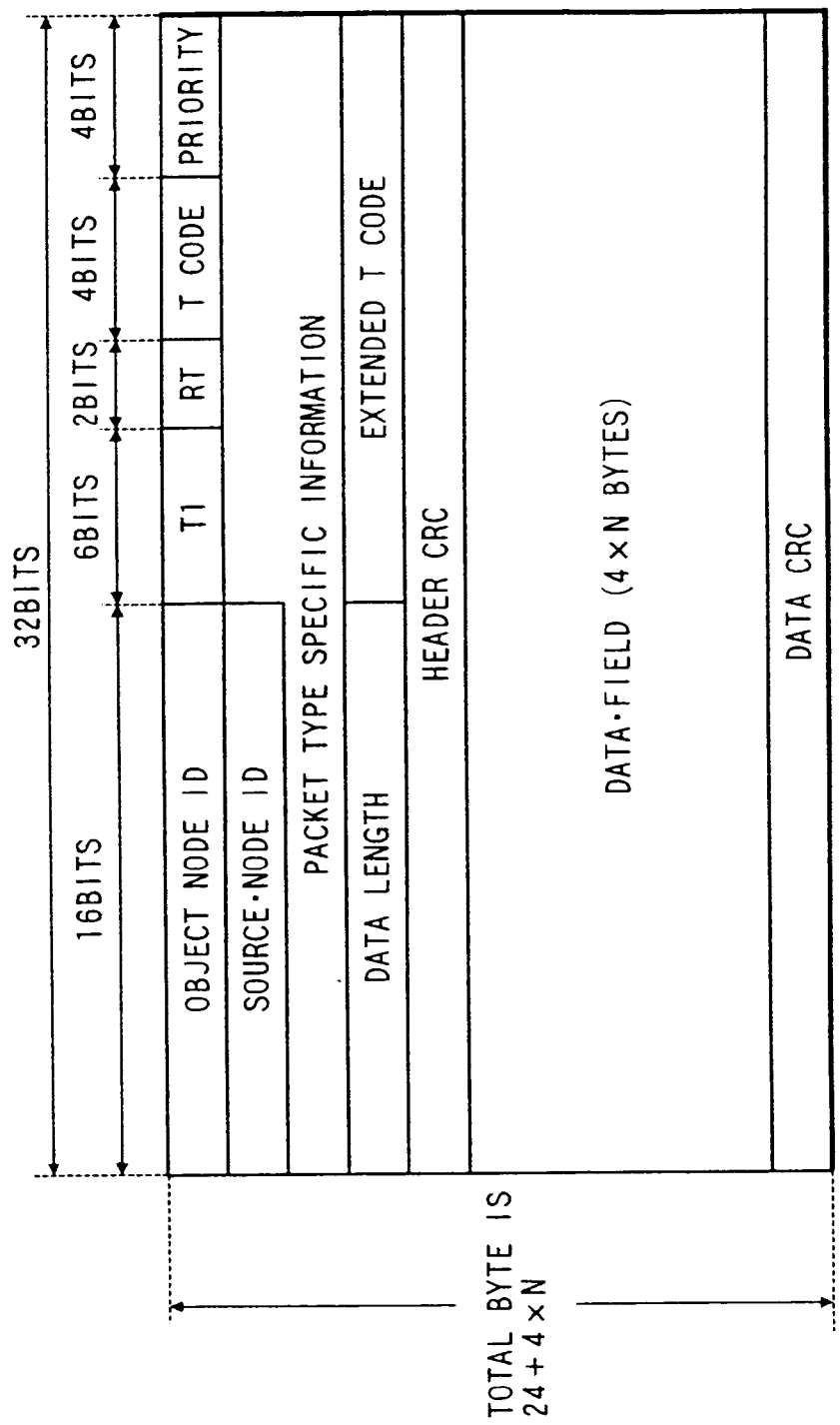
FIG. 16 is a diagram showing a packet structure for the Asynchronous transfer.

An example packet format for asynchronous transfer is shown in FIG. 16.

The packet consists of a data portion, error correction CRC data and a header portion in which are entered an object node ID, a source node ID, the length of data to be transferred and various types of code, as is shown in FIG. 15.

Asynchronous transfer is a one-to-one communication between a specific node and another node. A packet from a transmission source node is transmitted to all the nodes in a network; however, since all nodes ignore packets that are addressed to other nodes, only the addressed node can read the packet.

This completes the description of the asynchronous transfer of data.

<<Isochronous Transfer>>

An isochronous transfer is a synchronous transfer, which is the most distinctive feature of the 1394 serial bus and makes it appropriate for the transfer of multimedia data, such as video data and audio data, for which real-time data transfer is required.

While an asynchronous transfer is a one-to-one communication procedure, when an isochronous transfer is performed data from one transmission source node are uniformly transmitted to all the other nodes.

Figure 17:
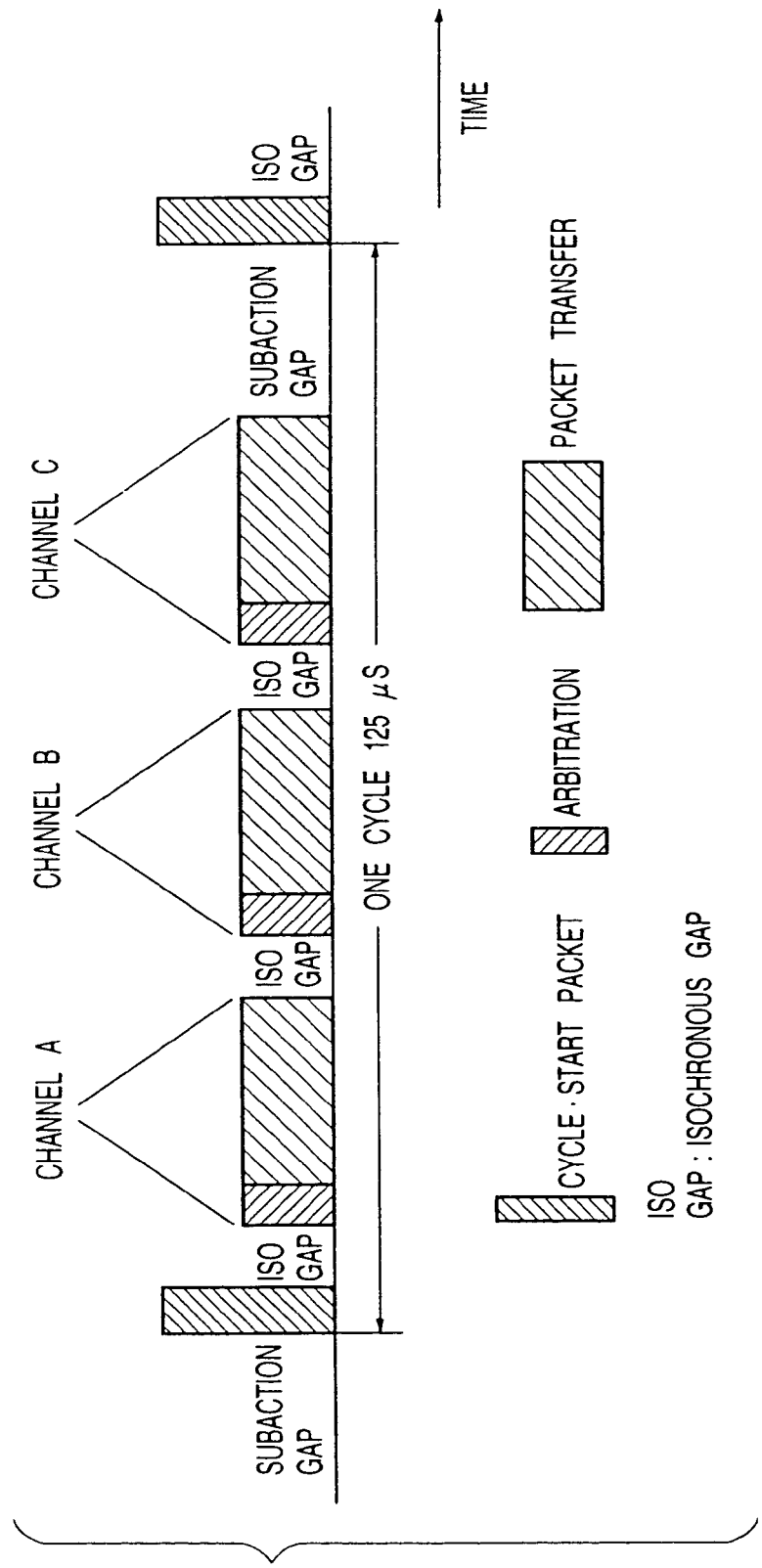
FIG. 17 is a diagram showing a sub-action for an Isochronous transfer.

FIG. 17 is a diagram showing the time-shift state for an isochronous transfer.

An isochronous transfer is performed over a bus at a constant time interval. This time interval is called an isochronous cycle, which is 125 µS. A cycle start packet serves as an indicator for each cycle start time and adjusts the time for the nodes. A node called a cycle master transmits the cycle start packet. When a predetermined period of time (a sub-action gap) has elapsed following the completion of an immediately preceding transfer cycle, the cycle start packet indicating the start of a current cycle is transmitted. The time interval at which the cycle start packet is output is 125 µS.

Further, since channel IDs, such as channel A, channel B and channel C shown in FIG. 17, are provided for a plurality of types of packets in one cycle, the packets can be identified during transmission. As a result, simultaneous, real-time transfer of data between nodes is possible, and a reception node need only fetch data selected in accordance with a channel ID. In this case, the channel ID does not represent the address of the transmission source, but merely provides a logical number relative to data. Therefore, a specific packet can be broadcast by one transmission source node to all the other nodes.

Before the isochronous transfer of a packet, the arbitration is performed, as it is an asynchronous transfer. Since unlike an asynchronous transfer an isochronous transfer is not a one-to-one communication procedure, the ack code (reception acknowledgement return code) is not used for an isochronous transfer.

The iso gap in FIG. 17 represents an idle time period that is required to confirm a bus is not being used before an isochronous transfer is performed. When the predetermined idle period has elapsed, a node that desires to perform an isochronous transfer will determine when the bus is not being used, and will perform arbitration before the transfer.

An example packet format for an isochronous transfer will now be explained while referring to FIG. 18.

Figure 18:
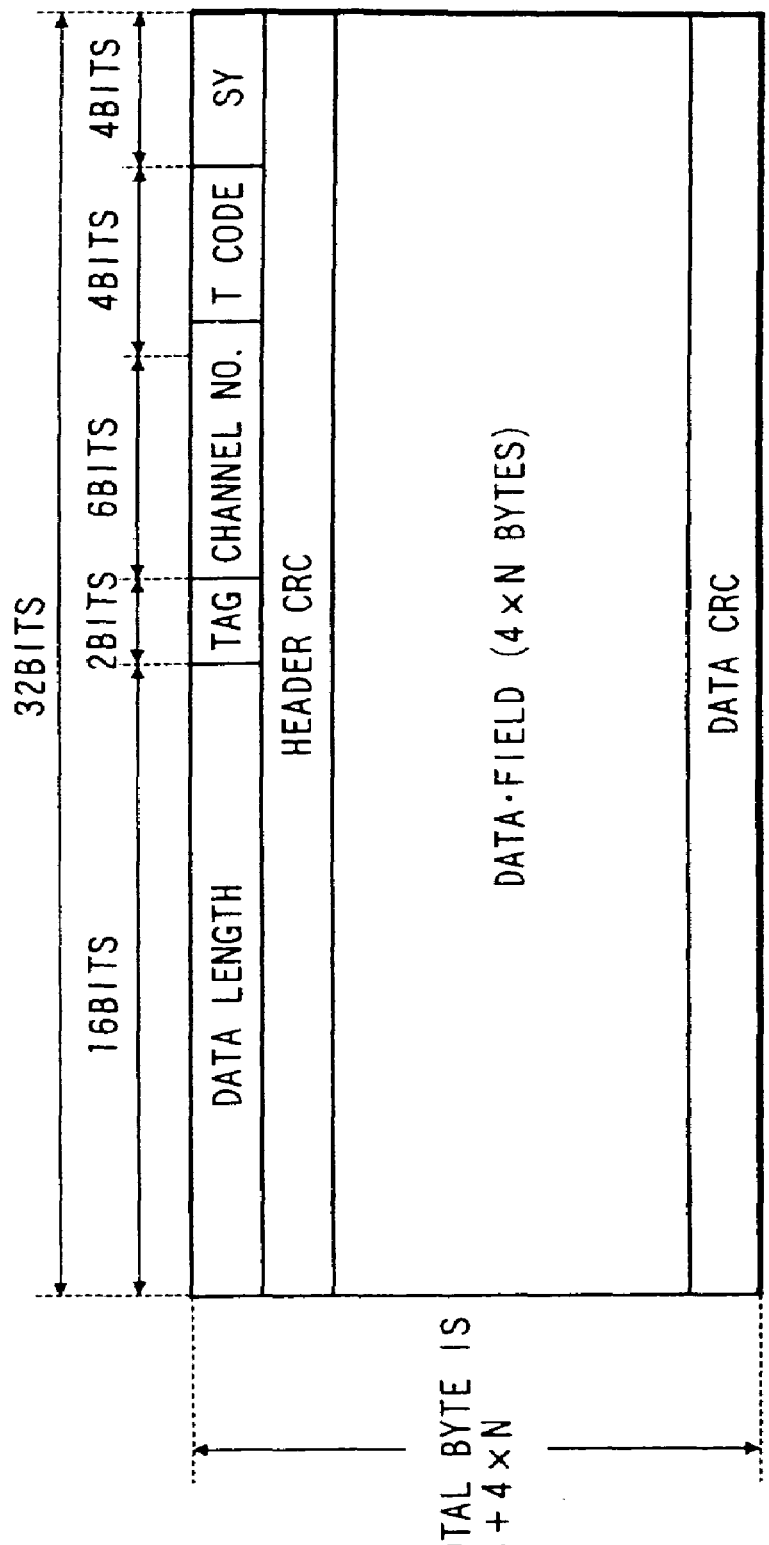
FIG. 18 is a diagram showing a packet structure for an Isochronous transfer.

Each of the packets sorted for individual channels includes a data portion, error correction CRC data and a header portion in which are written the length of the data that are to be transferred, a channel No., various types of code and an error correction header CRC as shown in FIG. 18.

This completes the explanation for the isochronous transfer of data.

<<Bus Cycle>>

Figure 19:
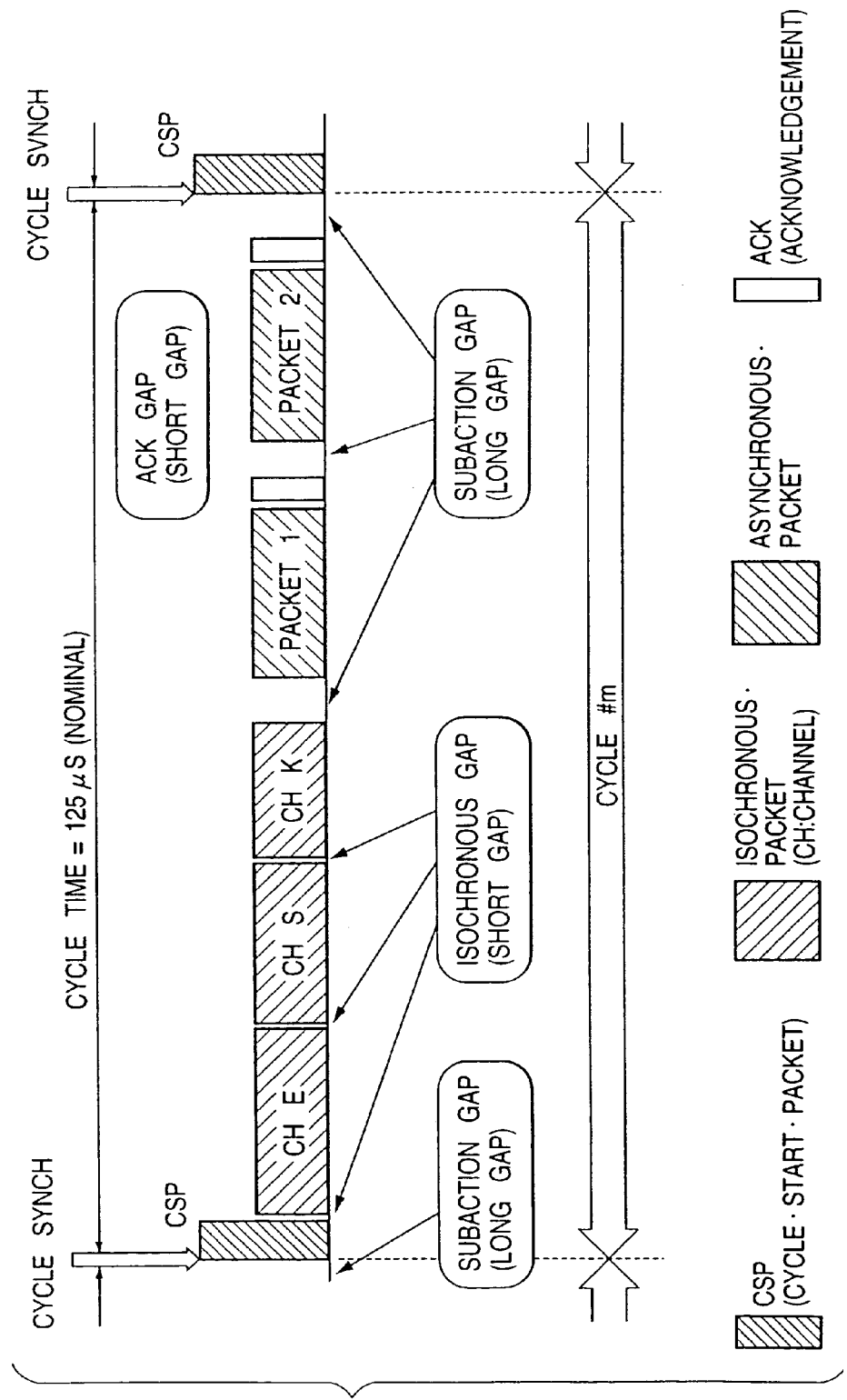
FIG. 19 is a diagram showing an example communication cycle for the IEEE 1394 standard.

For actual data transmission along the 1394 serial bus, an isochronous transfer and an asynchronous transfer can coexist. In FIG. 19 is shown the time-shift state on the bus where both an isochronous transfer and an asynchronous transfer are performed.

An isochronous transfer is performed before an asynchronous transfer because after the transmission of a cycle start packet, an isochronous transfer can be initiated that has a gap interval (isochronous gap) shorter than the gap interval (sub-action gap) for the idle time that is required for the performance of an asynchronous transfer. For this reason, an isochronous transfer is performed before an asynchronous transfer.

In FIG. 19, at the start of an ordinary bus cycle #m, the cycle start packet is transmitted by the cycle master to the nodes. Then, the individual nodes adjust the time, and when a predetermined idle time (an isochronous gap) has elapsed, the node that is to perform the isochronous transfer performs arbitration and begins the packet transfer. In FIG. 19, the packets for channel e, channel s and channel k are isochronously transferred in the named order.

The processing from the performance of the arbitration to the packet transfer is repeated the number of times that corresponds to the channel count, until the isochronous transfer during the cycle #m is completed, and then the asynchronous transfer is begun.

When the idle time reaches the sub-action gap, after which the asynchronous transfer is possible, the node that is to perform the asynchronous transfer decides that it can perform the arbitration.

It should be noted that the performance of the asynchronous transfer can only be performed when a sub-action gap, for initiating the asynchronous transfer, is obtained within a period extending from the completion of the isochronous transfer to the transfer of the next cycle start packet (cycle synch).

In the cycle #m in FIG. 19, the isochronous transfer of data for three channels and the asynchronous transfer (including the ack code) of two packets (packet 1 and packet 2) are performed. Since when the time following the transmission of asynchronous packet 2 reaches the start time (cycle synch) for cycle m+1, the transfer of data during cycle #m is terminated.

If the start time (cycle synch) for the transmission of the next cycle start packet is reached during the asynchronous or the isochronous transfer, the transfer is not forcibly halted, and the transmission of the cycle start packet for the next cycle is delayed until the idle period following the transfer has elapsed. That is, when one cycle exceeds 125 µS, or is longer, the 125 µS reference length of the next cycle is shortened a period of time equivalent to excess time taken up by the preceding cycle. The isochronous cycle can be extended or reduced with 125 µS being used as the reference time.

However, the isochronous transfer must be performed each cycle in order to provide the real time transfer of data, while the asynchronous transfer may be performed the next cycle when there is reduction in the length of the cycle interval.

The cycle master manages such delay information as well as other information.

FIRST EMBODIMENT

The preferred embodiments of the present invention will now be described in detail while referring to the accompanying drawings.

Figure 1B:
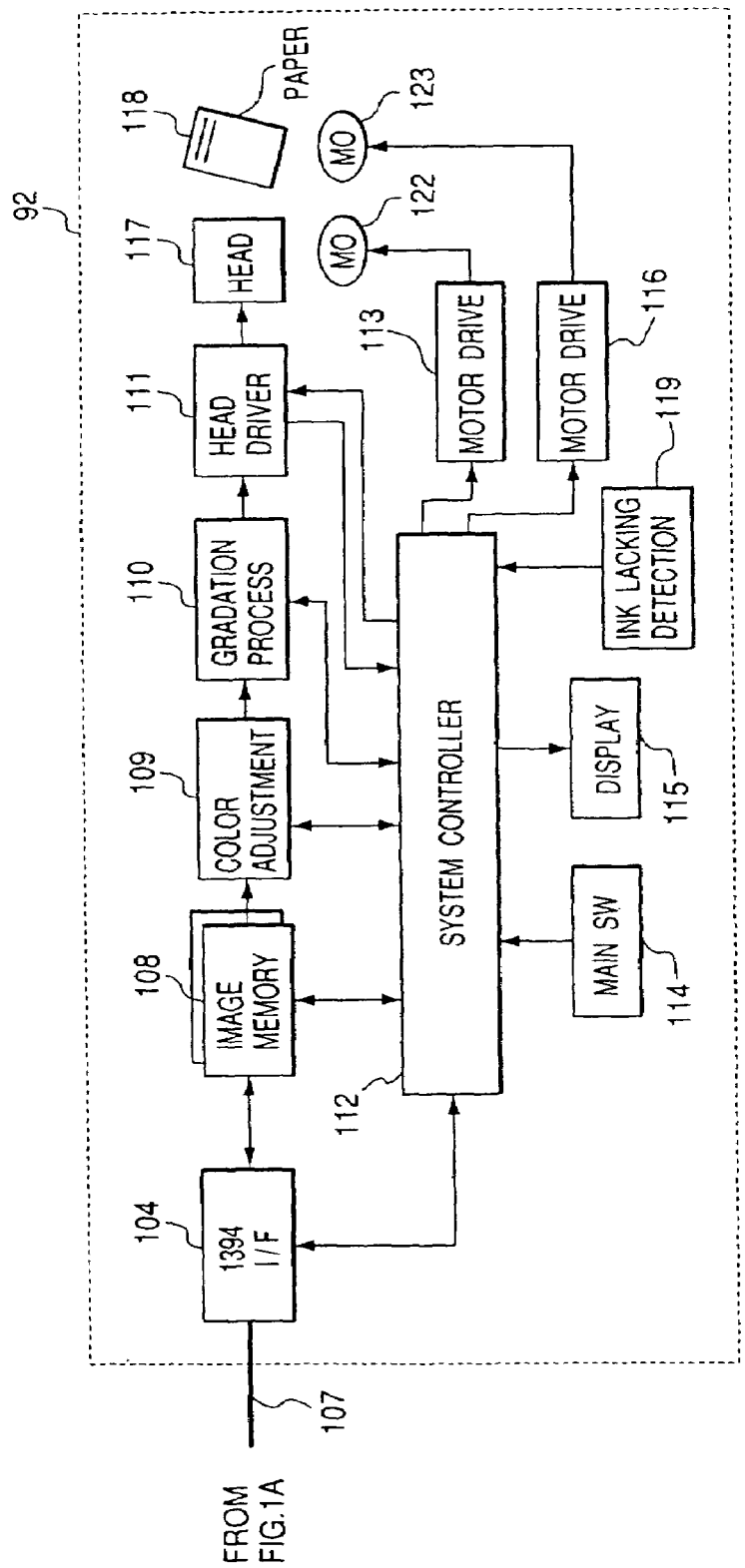
FIG. 1 is comprised of FIGS. 1A and 1B showing block diagrams illustrating an example system arrangement according to the present invention when a printer and a digital VTR are connected together.

FIGS. 1A and 1B are block diagrams illustrating an ink-jet printer and a camera-incorporated digital VTR with a liquid crystal monitor, which are connected via an IEEE 1394 serial bus.

In FIGS. 1A and 1B, a camera-incorporated digital VTR having a liquid crystal monitor (hereinafter referred to as a "digital VTR") 91 comprises: a magnetic tape 93; a head 94 for recording/reproducing data on the magnetic tape 93; an operating unit 95 for entering operation commands for the digital VTR 91; a system controller 96 for controlling the digital VTR 91 by using a microcomputer; a recording/reproducing processor 97 for recording/reproducing video data that are read by the head 94; a compression/expansion unit 98 for compressing or expanding the video data; a CG (Character Generator) 99 for generating characters, etc., to be displayed; a liquid monitor 100, the preferable liquid crystal for which is TFT or STN liquid crystal; a liquid crystal panel 120; a backlight 121 that uses a fluorescent lamp; a frame memory 121 in which is stored the output of the compression/expansion unit 98; a switch 101 for switching between a pickup mode and a reproduction mode; and an IEEE 1394 serial bus I/F 103. A printer 92 comprises: an IEEE 1394 I/F 104; an image memory 108 used for forming a print image; a color adjustment unit 109 for adjusting the colors in the print; a gradation processor 110 for performing gradation of the print; a head driver 111 for transmitting an image output by the gradation processor 110 to a printer head 117; a system controller 118 for controlling the printer 92 by using a microcomputer; a motor driver 113 for moving the printer head 117;

a motor driver 116 for driving a paper feeding motor; a main SW 114 used for powering on the printer 92 or for a key operation; a display 115 for displaying information concerning the printer 92; and an ink lack detector 119. The digital VTR 91 and the printer 92 are connected together by an IEEE 1394 cable.

For the printer recording head 117 of the present invention, either an electromagnetic-mechanical converter, such as a piezoelectric device, or an electric-thermal converter having a heating resistor for heating liquid can be employed as means for generating the energy received for the ejection of ink. In this embodiment, a bubble-jet recording head, for which thermal energy (film boiling phenomenon) is employed to eject liquid, is used.

The processing in the first embodiment in FIGS. 1A and 1B will now be described.

In order to perform so-called direct printing without passing data through a personal computer, first a reproduction mode instruction for the digital VTR 91 is input to the operation unit 95 to set the digital VTR 91 in the reproduction mode. The system controller 96 changes the switch 101, and desired video data is read from the magnetic tape 93 by the recording head 94. For the selection of a desired picture, the system controller 96 permits a mechanical conveying unit (not shown) to feed the magnetic tape 93 in consonance with information entered by the operation unit 95 in order to read the video data. The video data that are read are compressed and recorded using DCT (Discrete Cosine Transformation), which is a well known DV method, quantization and VLC (Variable Length Coding). Thus, variable length decoding, inverse quantization, and inverse DCT are performed for the data, and the compression/expansion processor 97 performs an expansion process for the resultant data. The data are then transmitted through a D/A converter and displayed on the LCD monitor 100. In addition, the system controller 96 permits the CG 99 to multiplex characters with video data and display them.

To print the reproduced video data, the video data output by the recording/reproduction processor 97 are decoded by the compression/expansion unit 98, and the resultant data are first stored in the frame memory 102 and are then transmitted to the I/F 103 of the digital VTR 91, following which they are isochronously transferred via the IEEE 1394 cable 107 to the I/F 104 of the printer 92.

The video data received by the printer 92 are formed into a print image in the image memory 108, and the image is printed by the ink-jet printer head 109. The system controller 112 controls writing/reading relative to the memory 108, the movement of the printer head 109, and the operation of the driver 111 that feeds paper.

In this manner, the video data reproduced by the digital VTR 91 are transmitted via the IEEE 1394 cable 107 to the printer 92, and are directly printed by activation of the printer driver 111.

Also, in response to an ink lack detection signal issued by the ink lack detector 116, the system controller 112 instructs the I/F 104 to transmit a warning command to the digital VTR 91.

The methods for detecting the lack of ink are, for example,
(1) a method whereby the deformation of an ink tank made of elastic material, due to a reduction in the quantity of ink, is detected by a mechanical switch;
(2) a method whereby a detection current is supplied to two special electrodes located so that they directly contact the ink in an ink tank, and the resistance between the electrodes is detected; and
(3) a method whereby the count of the dots ejected is acquired and stored, and using this count, an estimate of the total amount of ink that has been consumed is obtained and employed to predict when the ink will run out.

While the present invention is not limited to the above methods for detecting the lack of ink, in this embodiment method (2) is employed.

Figure 2:
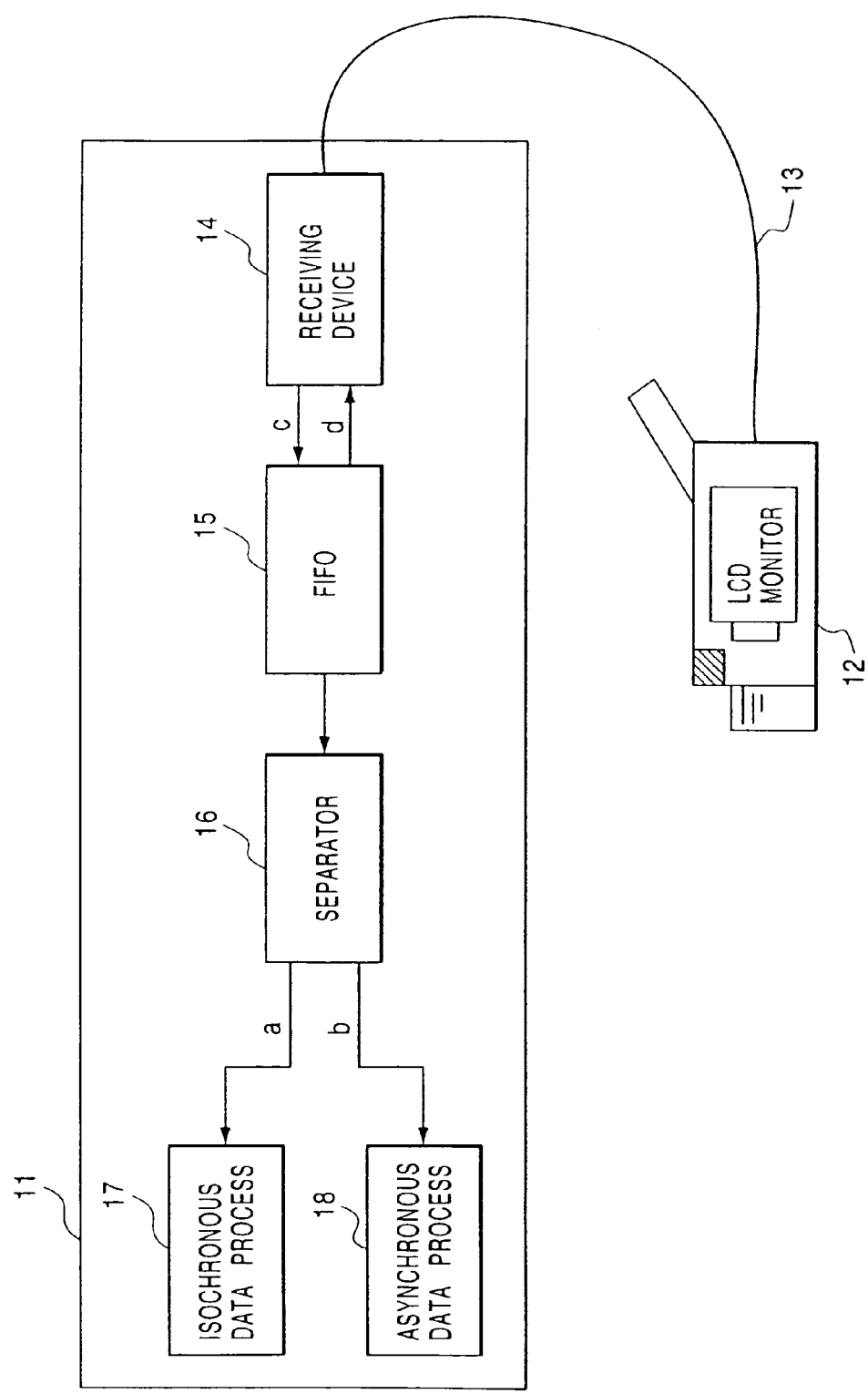
FIG. 2 is a block diagram illustrating the arrangement of a data reception section in FIGS. 1A and 1B.

FIG. 2 is a block diagram illustrating the arrangement of a device, in a communication system, that receives data. A reception unit 11, which is a printer 92, and a transmission unit 12, which is a digital VTR 91, are connected at their input/output ports (not shown) by an IEEE 1394 cable 13, which is constituted by two twisted pair cables, for the input and the output of data.

Data from the transmission unit 12 are transmitted via the IEEE 1394 cable 13 to the receiver 14 of the reception unit 11. The receiver 14 receives an FIFO state signal d from an FIFO 15. When the FIFO state signal d does not indicate the FIFO 15 is "Full", the receiver 14 writes a received signal c to the FIFO 15.

The receiver 14 examines the header of the packet in the received signal c to determine whether the packet is composed of isochronous data or asynchronous data. If the received signal c is an asynchronous packet and can be written to the FIFO 15, the receiver 14 returns to the transmission unit 12 an "OK Ack (Acknowledge: affirmative response)", which means reception is OK. When the received asynchronous data can not be written to the FIFO 15 because the FIFO state signal d indicates the FIFO 15 is "Full", the receiver 14 returns a "Busy Ack" to the transmission unit 12. Upon the receipt of the "Busy Ack", the transmission unit 12 attempts a re-transmission of the same asynchronous packet during a period in which the specified condition is satisfied.

The packets written to the FIFO 15 are read by a separator 16 in the order in which they were written, and are separated into isochronous data a and asynchronous data b, based on the headers of the packets. The isochronous data a are transmitted to an isochronous data processing block 17, and the asynchronous data b are transmitted to an asynchronous data processing block 18. The data output by either the data processing block 17 or 18, or by both blocks 17 and 18, are transmitted to the printer head, and a printing operation is begun.

In consonance with those isochronous/asynchronous data that are received and processed, the printer 92 performs the printing operation.

A search for a static picture performed by the digital VTR 91 will now be described.

In the DV format specified for a public digital VCR, two ID signals are recorded: a PP ID used to perform a fast search for a static picture, and an INDEX ID used to perform a search for a desired static picture data recorded in a static picture portion.

The processing in which a tape on which the PP ID and the INDEX ID are recorded is loaded into the digital VTR 91 and is actually employed to perform a search will now be described while referring to the flowcharts in FIGS. 3A and 3B. The static picture search method in this embodiment is called a PP MARK search.

Figures 3, 3A:
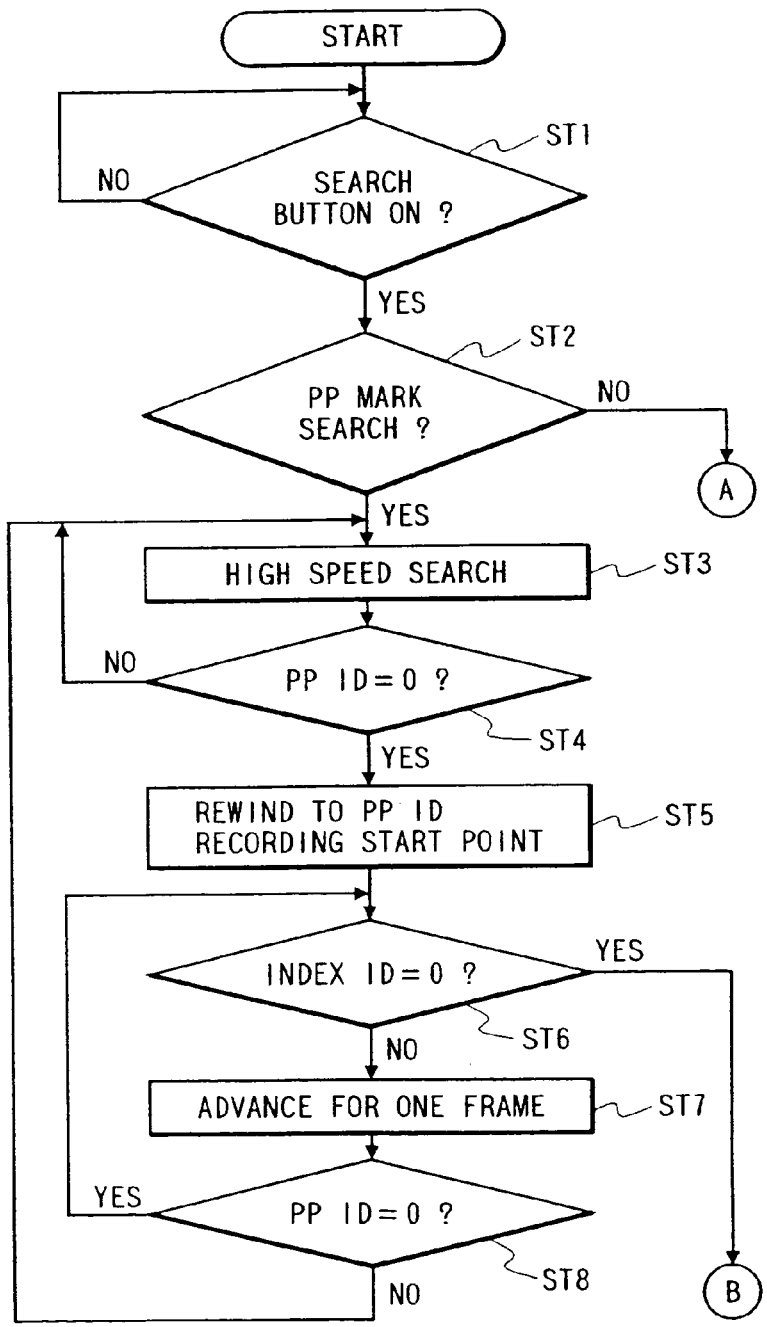
FIG. 3 is comprised of FIGS. 3A and 3B showing flowcharts for explaining the processing performed when searching for a static picture using the digital VTR in FIGS. 1A and 1B.

In FIGS. 3A and 3B, first, a check is performed to determine whether a user has issued a search request (ST1). When the search request has been issued, a check is performed to determine whether the search request is a request for a PP MARK search (ST2). If the result is YES, the static picture where the PP ID is recorded on the sub-code portion is searched for by running the tape at high speed (ST3 and ST4). When the static picture portion is found, the tape is rewound at a lower speed until the PP ID record start point, i.e., the head of the portion for which the static picture is recorded, is reached (ST5). Then, the tape is slowly moved forward until the INDEX ID is detected, after which a desired static picture is searched for (the loop at ST6 to ST8 is repeated). When the tape reaches the desired picture image recording position, the static picture is reproduced. This process is performed until the end of the static picture recording portion at which the value of a FC (Frame Change) signal is changed to "1" (ST9 and ST10).

When the tape reaches the end of the static picture recording portion, the tape is stopped, and the reproduced static picture data that have been recorded in the image memory during this process are repeatedly read and are displayed on the liquid crystal display monitor (ST11).

When the INDEX ID is not found, even though the loop at ST6 to ST8 is repeated a predetermined times, program control returns to the fast search process at ST3 in order to find the next static picture recording portion. It should be noted that a counter is provided to count the times the loop at ST6 to ST8 is repeated.

When the result at ST2 is NO, a check is performed to determine whether the request received from the user is for a conventional INDEX search for a moving picture (ST12). If the result is YES, the sub-code portion is examined to find the portion whereat the INDEX ID is included (ST13 and ST14).

When this portion is found, another check is performed to determine whether a PP ID is included in this portion (ST15). If a PP ID is not included, it is assumed that the portion is for the objective moving picture. The tape is rewound to the INDEX ID recording start point, and the picture reproduction is begun (ST16).

When, at ST15, the PP ID is included, it is assumed that the portion is the one designated for use for a static picture search and is not for the objective moving picture. Thus, reproduction of the picture is not performed. If, at ST12, the result is NO, program control moves to perform a search process (e.g., a search using a recording date) other than the above process instructed by the user.

The actual printing operation will now be described.

Figures 5, 5A:
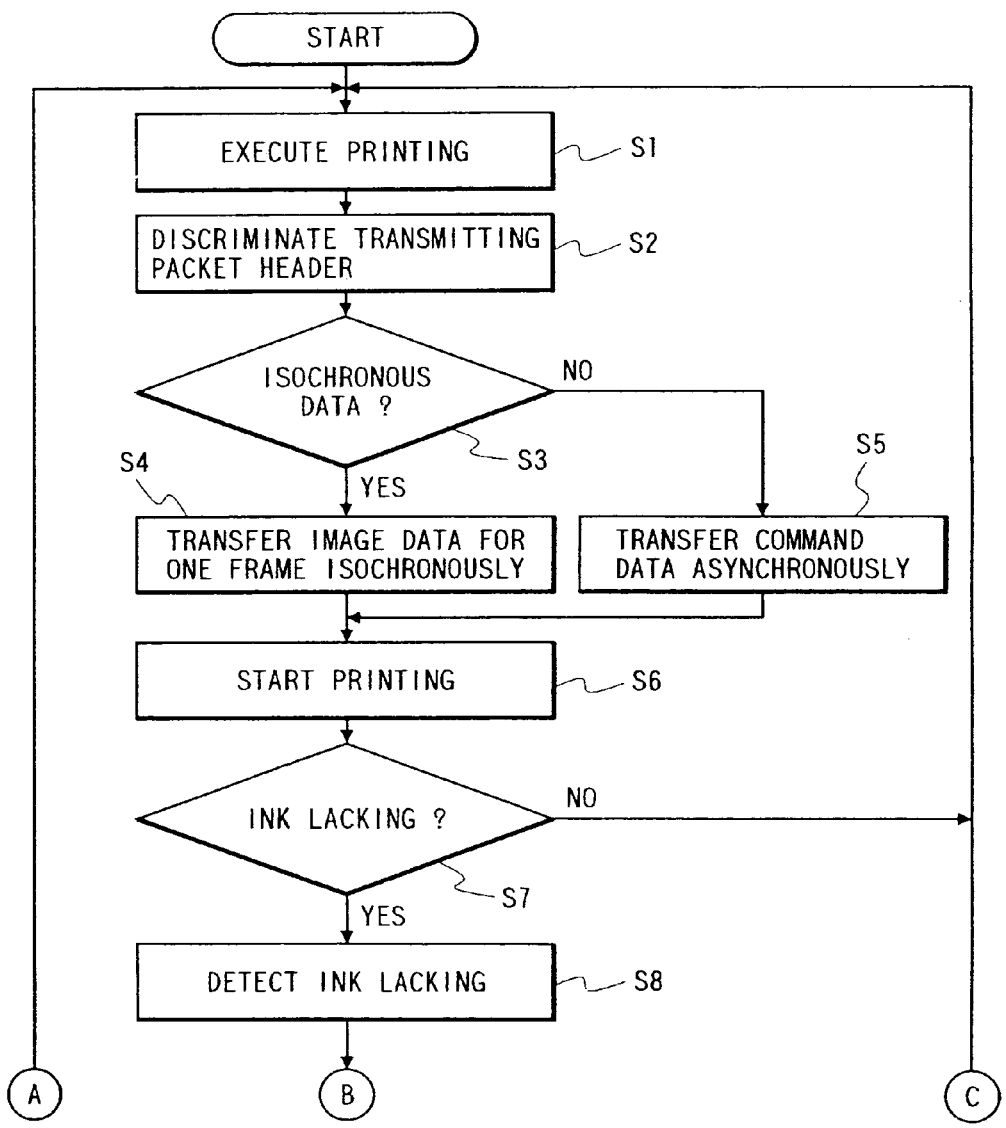
FIG. 5 is comprised of FIGS. 5A and 5B showing flowcharts for the print processing performed by a video printing system according to a first embodiment of the present invention.
Figure 5B:
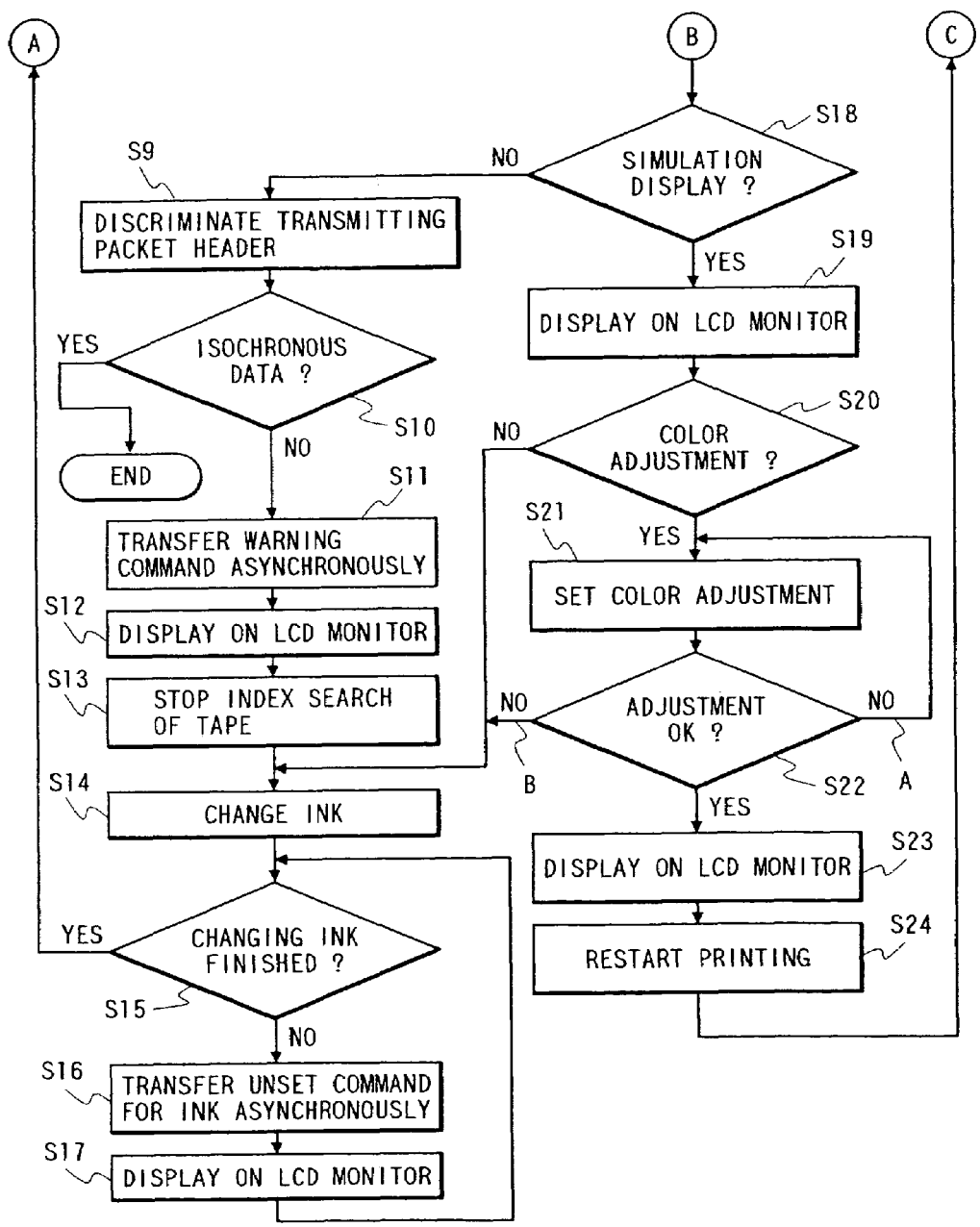

FIGS. 5A and 5B are flowcharts showing the printing processing, an explanation of which will follows.

First, the printing instruction is carried out by the main body of the digital VTR 91, or by using a remote controller (S1).

Following this, the digital image data are changed into a packet by reproduction of the digital VTR 91, and the header of the packet is identified as a transmission packet (S2). As a result, a check is performed to determine whether the image data are isochronous data (S3). If the image data are isochronous data, image data for one frame are transferred to the printer 92, which is an isochronous transfer destination (S4). The image data that are not isochronous data, such as command data, are asynchronously transferred to the printer 92 (S5).

Upon the receipt of the data, the printer 92 begins printing (S6). When the ink runs out after a predetermined number of sheets have been printed (S7), the lack of ink is detected (S8). As long as the ink lasts, normal printing is continued.

An explanation will now be given for an operation in which a simulation displayed when printing is to be continued even though a lack of ink is detected, and for an operation in which such a simulation is not displayed.

When a simulation is not provided, a warning command data packet is modulated by the DS Link method, the modulated packet is output via a transmission path from the printer 92 to the digital VTR 91, and the header of the transmitted packet is identified (S9).

Figure 4A:
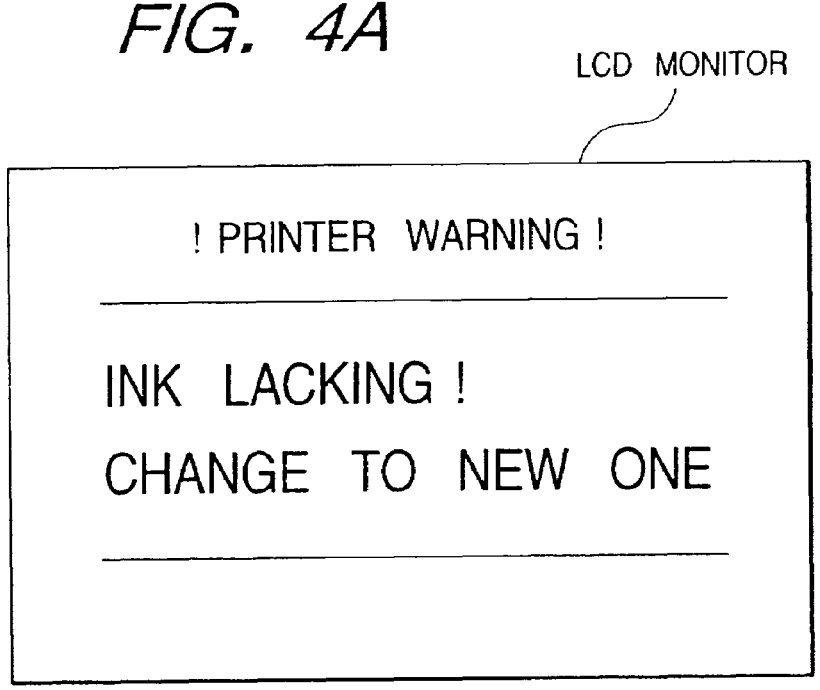
FIG. 4A is a conceptual diagram showing an example display on an LCD monitor.

As a result, whether or not the command data are isochronous data is determined (S10). If the command data are not isochronous data, the data are asynchronously transmitted to the digital VTR 91 (S11). If the command data are asynchronous data, the data transfer is then terminated. Then, the command data received by the digital VTR 91 are displayed on the LCD monitor 100, which is mounted in the digital VTR 91 (S12). This display is shown in FIG. 4A. When the alarm "Out of ink" is displayed on the LCD monitor for a user, the transmission side can understand the state of the printer 92, so that functioning of the printing process is improved.

Figure 4B:
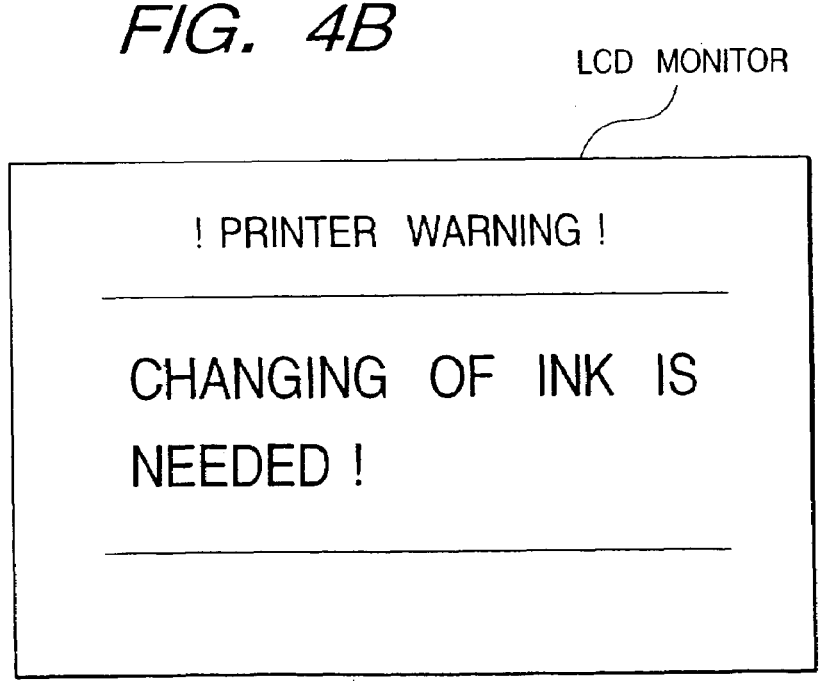
FIG. 4B is a conceptual diagram showing another example display on the LCD monitor.

Following this, the search for the INDEX that is marked on the tape in the digital VTR 91 is halted in accordance with the displayed alarm (S13). This is because the system is maintained in the state where a desired static picture scene can be printed again immediately. The system waits untie the ink is replenished (S14), and when the replenishment of ink is completed (S15), the printing is restarted. When the replenishment of ink is not quickly completed, a warning notice to the effect that ink is exhausted is asynchronously transferred (S16) and is displayed on the LCD monitor 100 of the digital VTR 91 (S17). When alarm message "replenishment of ink is needed" shown in FIG. 4B is displayed, it is a user-friendly function.

When the replenishment of ink is completed, a message "Ink replenishment completed" may be displayed on the LCD monitor 100.

Such notices may be displayed in the same manner on the display 115 provided for the printer 92.

Next, in a case where the simulation is displayed, image simulation is displayed on the LCD monitor 100 of the digital VTR 91 (S19). The user checks on the image quality, and a step for adjusting the color is initiated (S20). When there are no problems with the colors, color adjustment is not performed, and either printing is begun while ink is exhausted, or it is determined at the branch B at step S22 in FIG. 5B that the replenishment of ink is necessary and the ink replenishment is performed (S14).

When color adjustment is performed, at branch A at step S22 in FIG. 5B, a color, such as a monochrome or sepia color, that can be reproduced even though ink has run out is set (S21). If the color adjustment is satisfactory (S22), the data are displayed on the LCD monitor 100. After confirmation, the printing is resumed (S24). If the color adjustment is unsatisfactory, the replenishment of ink or color re-adjustment is performed.

Figure 7A:
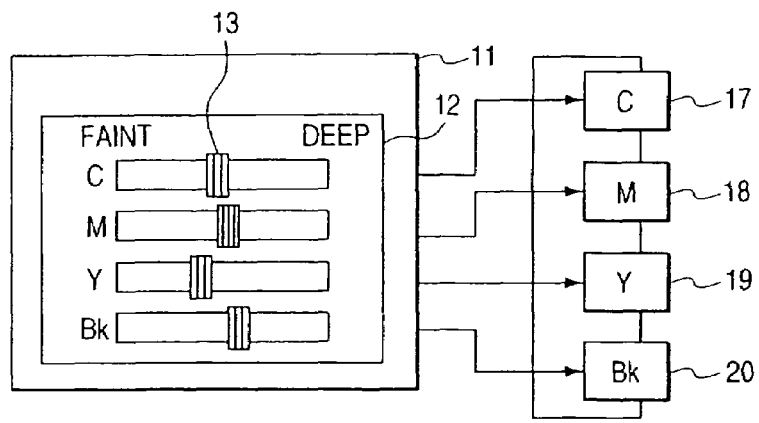
FIG. 7A is a specific diagram showing an example control panel display for color adjustment.

FIG. 7A is a specific diagram illustrating a control panel for explaining a specific color adjustment method.

Color adjustment knobs 13 to 16 are provided for a control panel 12 of a discharge volume adjustment unit 11, and color tone conditions set by the manipulation of the knobs are input to electromagnetic conversion devices of ink ejection heads 17 to 20.

The color adjustment knobs 13 to 16 on the control panel 12 independently control the individual colors cyan, magenta, yellow and black for matching the quality of the simulation image on the display.

Figure 7B:
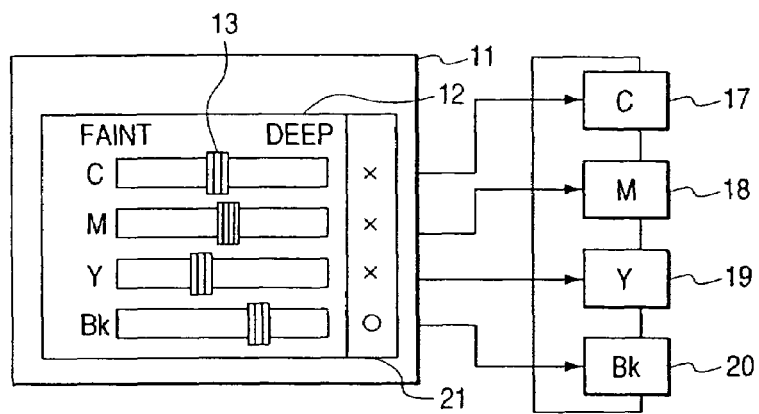
FIG. 7B is a specific diagram showing a control panel that indicates there is a lack of ink.

The color adjustment knobs 13 to 16 in FIGS. 7A and 7B are sliding knobs, and as a knob is slid to the right the intensity of a printing color is increased, while when it is slid to the left the intensity is reduced.

In FIG. 7B is shown a display of a panel when ink other than black has run out. The remaining black ink is used to adjust the color density for a monochrome display.

For the inks that have run out, the display characters for the color elements become faded, and an "x" is displayed for each color on a check display 21 to enable a user to identify the colors that are not available for use.

Figure 7C:
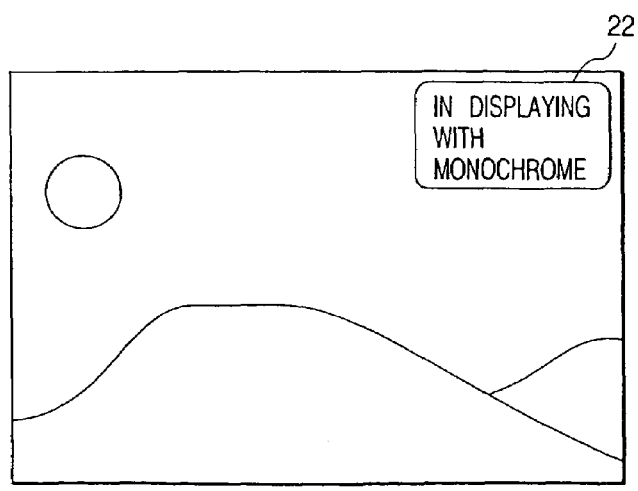
FIG. 7C is a diagram showing an example display for color adjustment.

In FIG. 7C is an example display for a monochrome screen when uses black ink. A message, such as "Display in monochrome", appears on the screen.

In this embodiment, when the amount of electric energy to be applied to the electric-heat conversion device of a print head is changed, the thermal energy with which ink is heated and ejected is also changed, so that the amount of ink ejected for each color can vary.

SECOND EMBODIMENT

Figure 6:
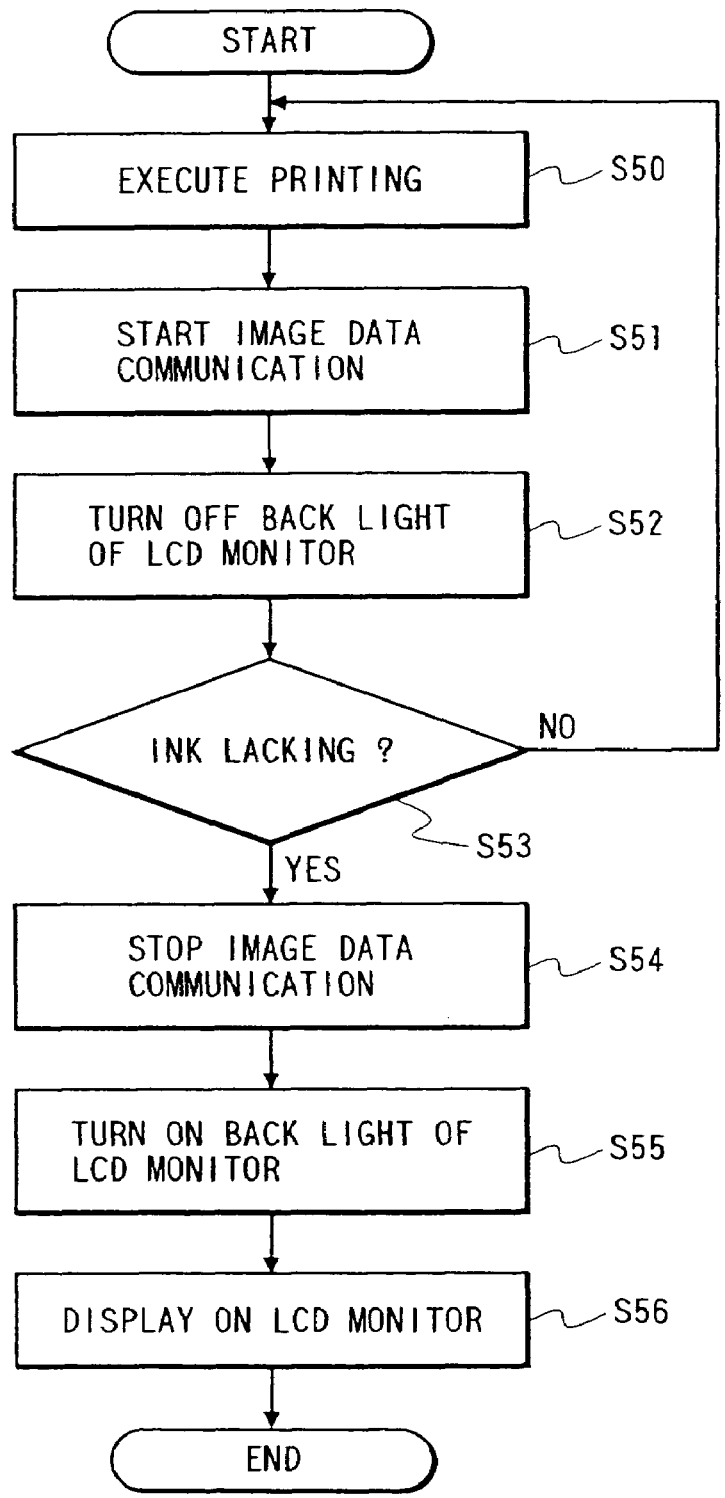
FIG. 6 is a flowchart for the print processing performed by a video printing system according to a second embodiment of the present invention.

A second embodiment for which a power saving mode is provided will now be described while referring to the flowchart in FIG. 6.

First, a printing command is executed by the main body of a digital VTR, or by a remote controller (S50), and the transmission of image data from the digital VTR to a printer is begun (S51). The backlight of an LCD monitor provided for the digital VTR is powered off (S52), and as a result, the power saving of the digital VTR can be implemented. This is preferable, especially when for printing the digital VTR is powered by a battery, such as a lithium ion battery.

Upon the receipt of the data, the printer begins to print. When the ink runs out after a predetermined number of sheets have been printed (S53), the communication of image data is halted (S54). So long as the ink does not run out, the normal printing process continues, and at this time, the backlight is again powered off.

Upon the occurrence of the running out of ink, the backlight of the LCD monitor is turned on (S55), and a warning as shown in FIGS. 4A and 4B is displayed on the LCD monitor (S56). The processing is thereafter terminated.

As is described above, the backlight is powered off while image data are being transmitted, and is powered on when a command data warning signal is received, so that the consumption of power by the digital VTR can be reduced.

The camera-incorporated VTR has been employed for the description of the present invention, but a digital camera for recording a static picture may also be employed.

In the above embodiments the data are transferred after they are decompressed; however, if the printer is so designed that it can employ the hardware or software to perform decompression, compressed data may be transmitted across the IEEE 1394 interface.

For compression, the MPEG method, the coding method, accompanied by wavelet transformation, or the fractal coding method may be used as well as the DV method.

A video camera has been employed as the image input device, but a scanner may be employed.

As is described above, according to the embodiments, information to the effect that the printer has run out of ink can be displayed on the LCD monitor that is provided for the camera-incorporated VTR. As a result, the user can easily obtain information concerning the printer, so that functioning of the printing process can be drastically improved.

Data concerning the state of a printer that is an external device may include information other than the status of the ink supply, such as a notification that an ink head is musing or that there is no recording paper.

In addition, since the backlight is powered off during the transmission of image data, and is powered on when a warning is displayed, power saving can be implemented for the camera-incorporated digital VTR.

According to the first embodiment of the present invention, data communication in multiple directions is performed using the DS-Link method, and information obtained for an external device is displayed on the monitor. Therefore, only a simple structure is required for a user to obtain information concerning the state of the external device.

According to the second embodiment, since the backlight of the display means is turned off during the transmission of image data, the wasteful consumption of power can be reduced.

According to the other embodiment, since the state of another electronic device is displayed on the monitor display means of a camera-incorporated recording/reproduction apparatus, the states of other apparatuses can be displayed without any special display device being required.

What is claimed is:

1. A camera which is battery-operated and integrally contains a monitor, said camera comprising:

reproducing means for reproducing an image recorded on a recording medium and generating an image signal;

supply means for supplying the image signal to a monitor having a backlight;

communication means for transmitting the image signal to a printer, and for receiving a signal indicating abnormality from the printer, via two-way communication; and control means for controlling operation so as to turn off the backlight of the monitor when image data is transmitted to the printer by said communication means, after the transmission of the image signal and during printing of the image signal by the printer, thereby saving power and comprising power-savings-interruption means for interrupting the power savings during printing due to a printer abnormality by turning on the backlight in response to receipt of the signal indicating abnormality in the printer via said communication means.

2. A camera according to claim 1, wherein the printer starts a print operation in response to reception of the image signal, and said control means controls operation so as to turn on the backlight in response to occurrence of abnormality in the printer after the start of a print operation by the printer.

3. A camera according to claim 1, wherein the printer transmits a command indicating a lack of ink and, in response to reception of the command, said control means controls operation so as to turn on the backlight and so as to perform a warning display.

4. A control method for a camera which is battery-operated and integrally contains a monitor, said method comprising:

a reproducing step of reproducing an image recorded on a recording medium and generating an image signal;

a supply step of supplying the image signal to a monitor having a backlight;

a communication step of transmitting the image signal to a printer, and receiving a signal indicating abnormality from the printer, via two-way communication; and a control step of controlling operation so as to turn off the backlight of the monitor when image data is transmitted to the printer in said communication step, after the transmission of the image signal, and during printing of the image signal by the printer, thereby saving power and comprising a power-savings-interruption step for interrupting the power savings during printing due to a printer abnormality by turning on the backlight in response to receipt of the signal indicating abnormality in the printer in said communication step.

5. A control method according to claim 4, wherein the printer starts a print operation in response to reception of the image signal, and said control step controls operation so as to turn on the backlight in response to occurrence of abnormality in the printer after the start of a print operation by the printer and also to turn off the backlight of the monitor after transmitting the image signal and during printing of the image signal by the printer.

6. A control method according to claim 4, wherein the printer transmits a command indicating a lack of ink and, in response to reception of the command, said control step controls operation so as to turn on the backlight and to perform a warning display.

7. A print system in which a camera that is battery-operated and integrally having a monitor with a backlight communicates with a printer, wherein:
   said camera includes:
   reproducing means for reproducing an image recorded on a recording medium and generating an image signal,
   supply means for supplying the image signal to said monitor, and
   communication means for transmitting the image signal to said printer and for receiving a signal indicating abnormality from said printer, via two-way communication,
   said printer starts a print operation in response to reception of the image signal, and
   said camera further includes control means for controlling operation so as to turn off the backlight of said monitor when image data is transmitted to said printer by said communication means, after the transmission of the image signal, and during printing of the image signal by the printer, thereby saving power and comprising power-savings-interruption means for interrupting the power savings during printing due to a printer abnormality by turning on the backlight in response to receipt of the signal indicating abnormality in the printer via said communication means.

8. A print system according to claim 7, wherein
   the printer starts the print operation in response to reception of the image signal, and
   said control means controls operation so as to turn on the backlight in response to occurrence of abnormality in said printer after the start of a print operation by said printer.

9. A print system according to claim 7, wherein
   said printer transmits a command indicating a lack of ink, and
   in response to reception of the command, said control means controls operation so as to turn on the backlight and to perform a warning display.

10. A control method for a print system in which a camera that is battery-operated and integrally having a monitor with a backlight communicates with a printer, wherein, in the camera, said method includes:
    a reproducing step of reproducing an image recorded on a recording medium and generating an image signal,
    a supply step of supplying the image signal to the monitor,
    a communication step of transmitting the image signal to the printer, and receiving a signal indicating abnormality from the printer, via two-way communication, upon the printer starting a print operation in response to reception of the image signal, and
    a control step of controlling operation so as to turn off the backlight of the monitor when image data is transmitted to the printer in said communication step, after the transmission of the image signal, and during printing of the image signal by the printer, thereby saving power and comprising a power-savings-interruption step for interrupting the power savings during printing due to a printer abnormality by turning on the backlight in response to receipt of the signal indicating abnormality in the printer via said communication step.

11. A camera which is battery-operated and integrally contains a monitor, said camera comprising:
    supply means for supplying an image signal according to a reproduced target image to said monitor having a backlight;
    communication means for transmitting the image signal to an external apparatus via two-way communication; and
    control means for controlling operation so as to turn off the backlight of the monitor when image signal is transmitted to the external apparatus, after the transmission of the image signal, and during printing of the image signal, thereby saving power and comprising power-savings-interruption means for interrupting the power savings during printing due to an external-apparatus abnormality by turning on the backlight in response to receipt of signal indicating abnormality in the external apparatus via the communication means.

12. An camera according to claim 11, wherein the external apparatus is a printer, and the printer starts a print operation in response to reception of the image signal.

13. A control method for a camera which is battery-operated and integrally contains a monitor, comprising:
    a supply step of supplying an image signal according to a reproduced target image to said monitor having a backlight;
    a communication step of transmitting the image signal to an external apparatus via two-way communication; and
    a control step of controlling operation so as to turn off the backlight of the monitor when the image signal is transmitted to the external apparatus, after the transmission of the image signal, and during printing of the image signal, thereby saving power and comprising a power-savings-interruption step for interrupting the power savings during printing due to an external-apparatus abnormality by turning on the backlight in response to receipt of a signal indicating abnormality in the external apparatus in said communication step.

14. A control method according to claim 13, wherein the external apparatus is a printer, the printer starts a print operation in response to reception of the image signal, and
    said control step controls operation so as to turn on the backlight in response to occurrence of abnormality in the printer after the start of a print operation by the printer.

* * * * *

UNITED STATES PATENT AND TRADEMARK OFFICE
CERTIFICATE OF CORRECTION

PATENT NO. : 7,443,530 B2  Page 1 of 1
APPLICATION NO. : 10/929536
DATED : October 28, 2008
INVENTOR(S) : Kenji Kawai It is certified that error appears in the above-identified patent and that said Letters Patent is hereby corrected as shown below:

ON THE TITLE PAGE
At Item (63), lines 2 and 3, "continuation-in-part" should read --continuation--.

Signed and Sealed this

Twenty-second Day of September, 2009

David J. Kappos
*Director of the United States Patent and Trademark Office*